US010028610B1

(12) United States Patent
Sundberg

(10) Patent No.: US 10,028,610 B1
(45) Date of Patent: Jul. 24, 2018

(54) WHISTLING POT AND PAN LID

(71) Applicant: Jason Sundberg, Garnet Valley, PA (US)

(72) Inventor: Jason Sundberg, Garnet Valley, PA (US)

( * ) Notice: Subject to any disclaimer, the term of this patent is extended or adjusted under 35 U.S.C. 154(b) by 212 days.

(21) Appl. No.: 14/967,206

(22) Filed: Dec. 11, 2015

(51) Int. Cl.
*A47J 27/212* (2006.01)
*A47J 36/06* (2006.01)

(52) U.S. Cl.
CPC ............ *A47J 27/212* (2013.01); *A47J 36/06* (2013.01)

(58) Field of Classification Search
CPC ......... A47G 19/00; A47G 19/14; A47J 27/00; A47J 27/212; A47J 36/06
USPC ................... 116/67 R, 71; 99/342, 343, 344; 220/912
See application file for complete search history.

(56) References Cited

U.S. PATENT DOCUMENTS

| | | | | |
|---|---|---|---|---|
| 1,943,834 A | * | 1/1934 | Meneghetti | ............ A47J 27/212 116/70 |
| 2,455,533 A | * | 12/1948 | Swindle | .................... F01P 11/14 116/112 |
| 2,536,369 A | | 1/1951 | Hubbard | |
| 2,682,250 A | * | 6/1954 | Ulrich | ....................... A47L 9/19 116/112 |
| 4,193,166 A | | 3/1980 | Neff | |
| 4,418,637 A | * | 12/1983 | Heermans | ............. A47J 27/212 116/70 |
| 4,862,552 A | * | 9/1989 | Remmel | ................ A47J 27/212 16/433 |
| 5,791,282 A | * | 8/1998 | Christ-Janer | ............ G08B 7/06 116/214 |
| 6,105,810 A | * | 8/2000 | Daenen et al. | ........ A47J 27/212 220/366.1 |
| 6,386,136 B1 | | 5/2002 | Huff | |
| 6,695,319 B1 | * | 2/2004 | Anota et al. | ............. A47J 27/09 220/203.11 |

(Continued)

FOREIGN PATENT DOCUMENTS

| | | |
|---|---|---|
| CN | 201341754 | 11/2009 |
| CN | 203041931 U | 7/2013 |

(Continued)

OTHER PUBLICATIONS

International Search Report and the Written Opinion of the Searching Authority dated Apr. 26, 2017, in connection with corresponding international Application No. PCT/US2016/065502 (12 pgs.).

*Primary Examiner* — R. A. Smith
(74) *Attorney, Agent, or Firm* — Maier & Maier, PLLC

(57) ABSTRACT

A whistling lid assembly for use as a stand-alone item, or with a pot, is disclosed herein. The lid assembly is adapted to sit upon a pot, the lid assembly including a lid, a hole formed in the lid, a whistle assembly attached to the lid assembly about the hole, the whistle assembly including a lower disc in fluid communication with the pot through the hole in the lid, the lower disc having a lower disc hole, an upper disc with an upper disc hole, and an outer wall surrounding outer radius surfaces of both the lower and the upper discs, and wherein when energy is applied to the contents of the pot causing steam to develop and pass through the hole in the lid to the whistle assembly, a whistling noise is generated through interaction between the steam, the lower disc hole and the upper disc hole.

8 Claims, 23 Drawing Sheets

(56) References Cited

U.S. PATENT DOCUMENTS

| | | | |
|---|---|---|---|
| 7,571,675 B1 | 8/2009 | Cappadona et al. | |
| 8,096,436 B2 * | 1/2012 | Rhetat et al. | A47J 27/09 220/203.01 |
| 2002/0178995 A1 | 12/2002 | Kane, Jr. | |
| 2005/0205577 A1 | 9/2005 | Park | |
| 2005/0247743 A1 | 11/2005 | Loring | |

FOREIGN PATENT DOCUMENTS

| | | | | |
|---|---|---|---|---|
| EP | 288862 A1 | * | 11/1988 | A47J 27/212 |
| GB | 200333 A | * | 7/1923 | A47J 27/212 |
| GB | 372114 A | * | 5/1932 | A47J 27/212 |
| GB | 473560 A | * | 10/1937 | A47J 27/09 |
| GB | 805201 A | * | 12/1958 | A47J 27/212 |
| JP | 08322733 A | | 12/1996 | |
| JP | 2007000455 A | * | 1/2007 | A47J 27/212 |
| JP | 02008086444 | | 1/2008 | |
| JP | 2008-86444 A | | 4/2008 | |
| JP | 3182845 U | | 3/2013 | |
| JP | 2014-136145 A | | 7/2014 | |

* cited by examiner

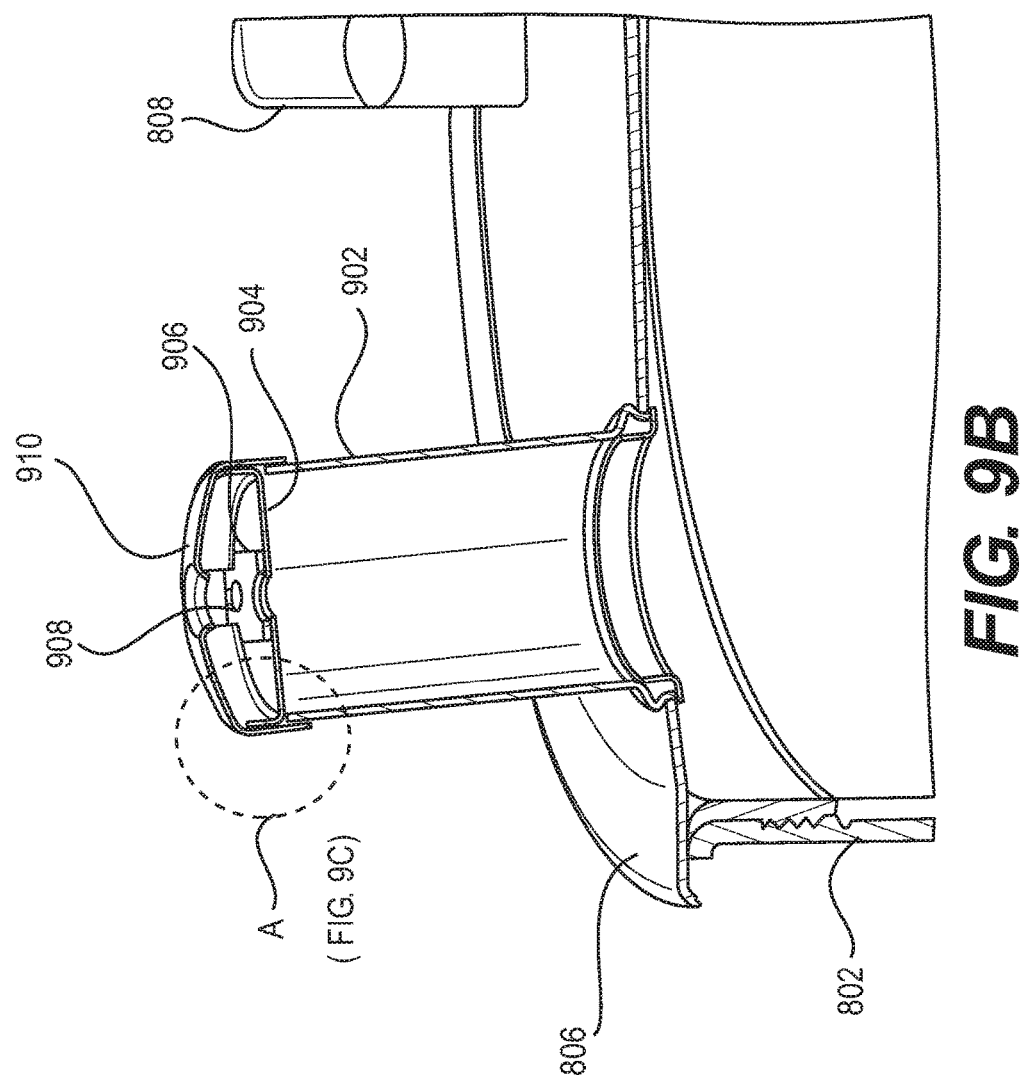

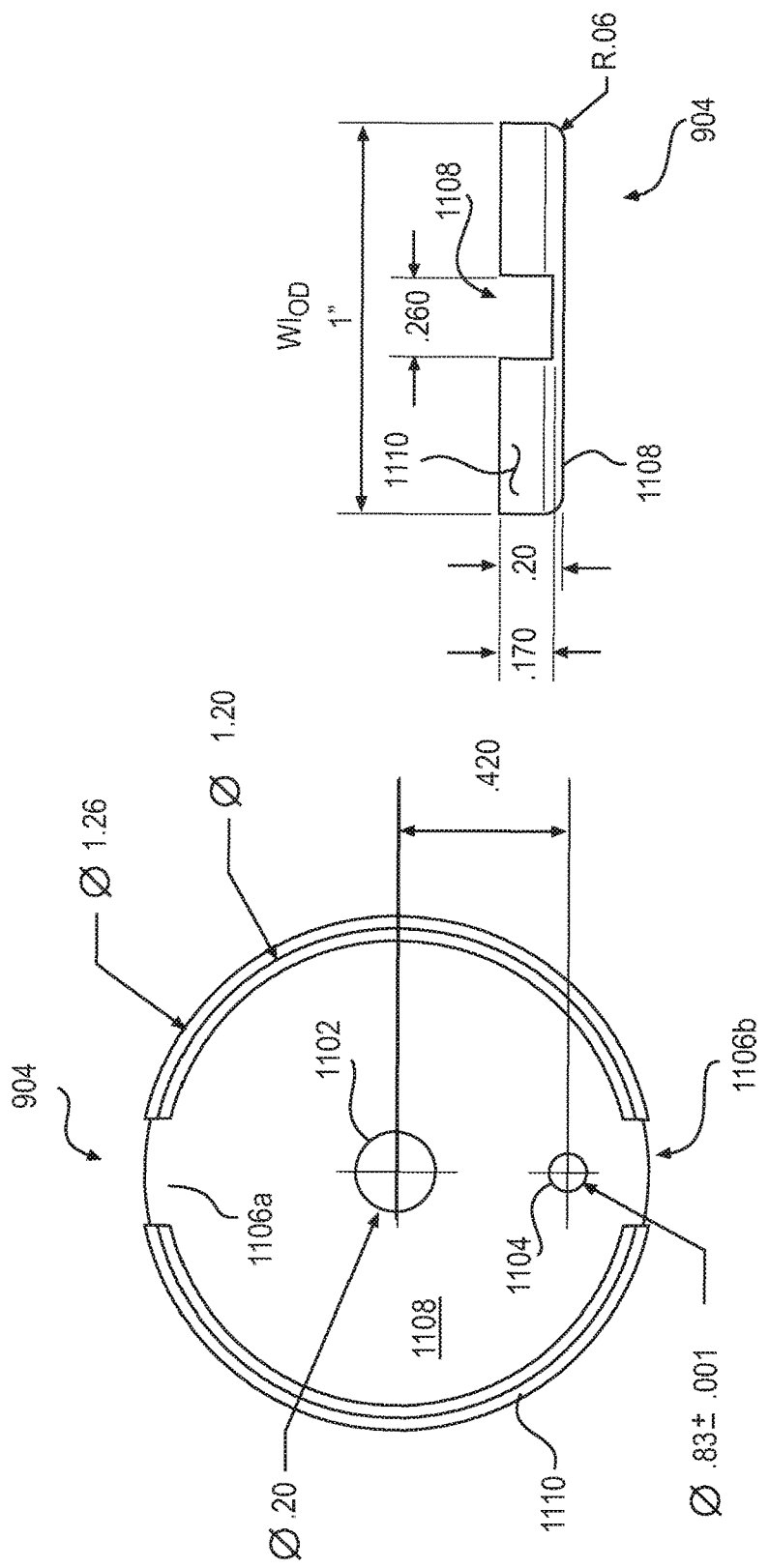

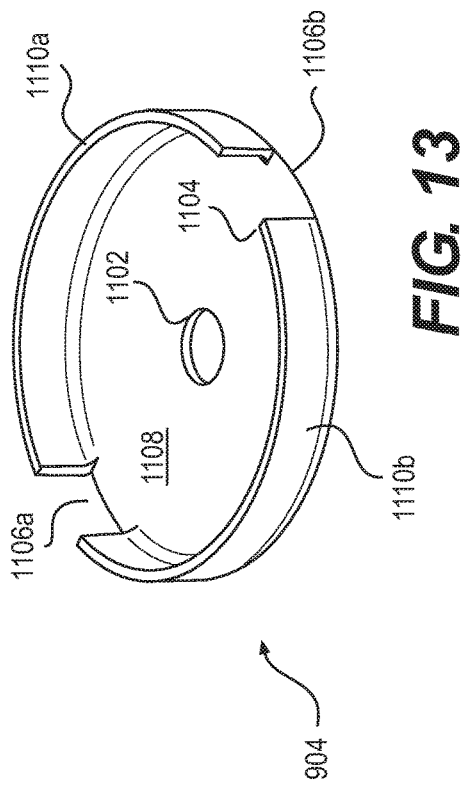
FIG. 13
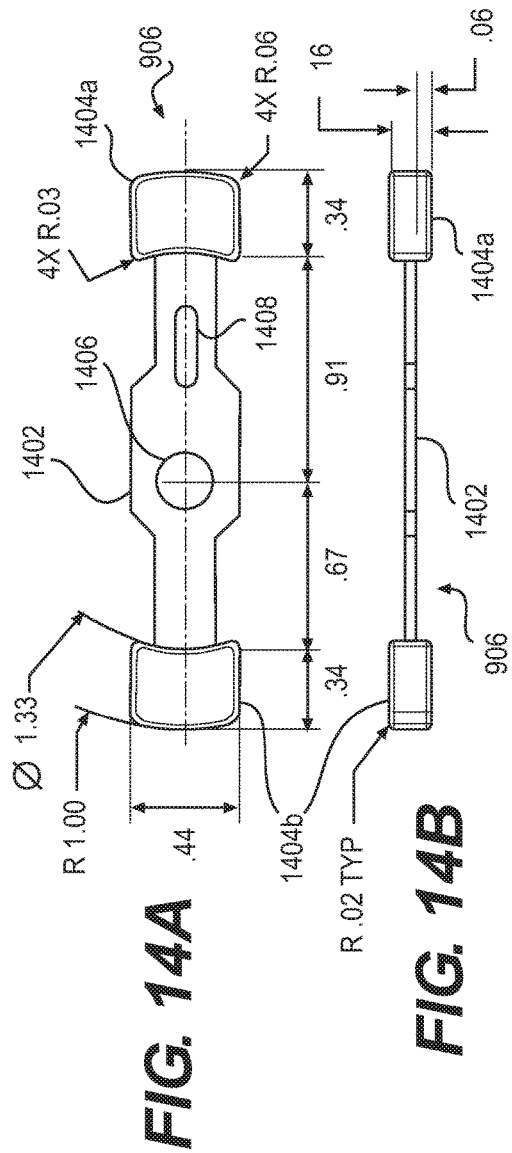
FIG. 14A
FIG. 14B

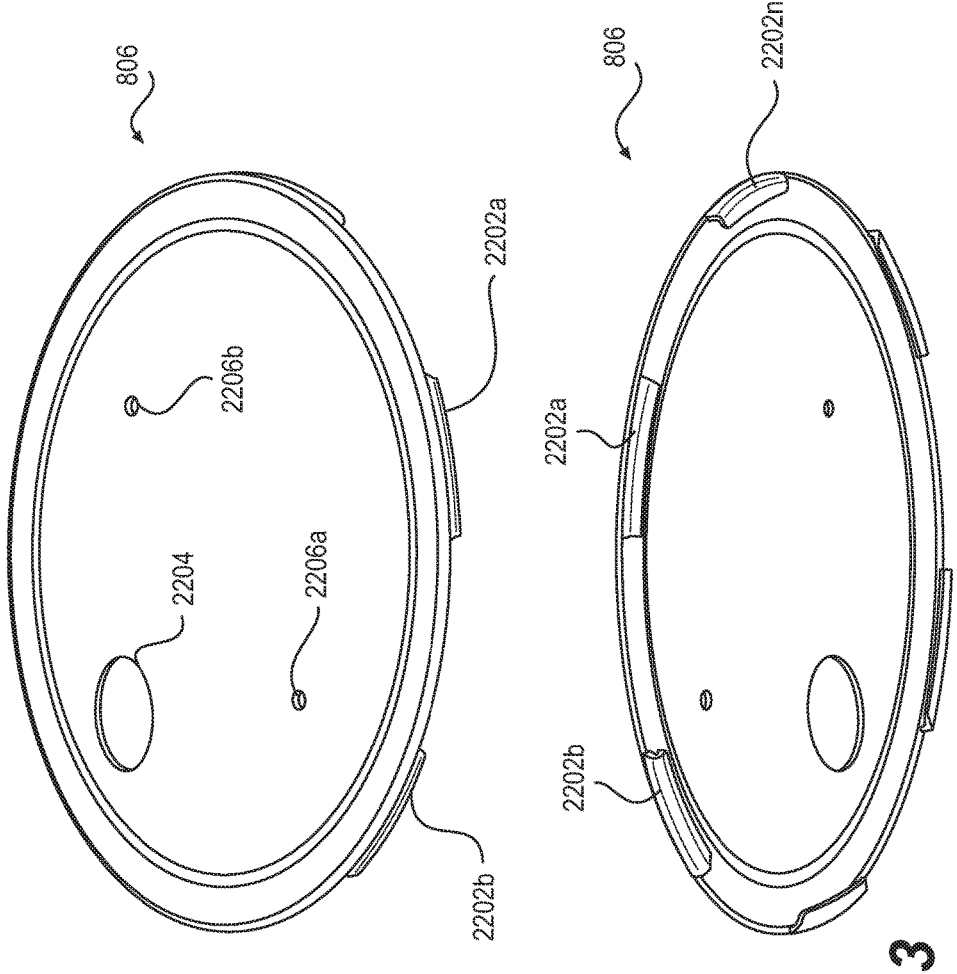

WHISTLING POT AND PAN LID

TECHNICAL FIELD

The embodiments described herein relate generally to kitchen devices, and more specifically to systems and methods for alerting users of a condition of boiling liquids.

BACKGROUND

One of the most basic necessities of life is nourishment; and yet, many people do not give much thought to the planning and preparation of their meals, especially if they frequent restaurants or diners and eat "out" most of the time. Others, however, are intimately familiar with the trappings of the modern—or not so modern—kitchen, and have accumulated a vast knowledge of recipes, cooking skills, safe food preparation, and other associated kitchen/cooking skills that are needed to make dining a nourishing and safe experience.

Considering even the first group of people, many, if not most, can boil water to make their tea or coffee in the morning. While it is generally easy to do this with any pot or pan, most people are familiar with tea kettles and the familiar whistle that occurs when a sufficient amount of energy has been transferred to the water to boil it, producing steam. The familiar, even familial, sound of the kettle alerts the user that the water is ready and can be used to make the tea, coffee, instant oatmeal, or whatever else requires boiled water.

However, it is also the case that larger quantities of water need to be boiled, sometimes with the food in it (e.g., pasta, potatoes, and so on), upon which it would be desirable to be alerted to the condition of the water reaching a boiling stage. Timers can be used, but that is a relatively inaccurate procedure unless the person cooking is quite familiar with the physics involved, and the exact measurements (altitude, quantity of water, and amount of applied heat are just a few of the factors involved). Thus, most people simply resign to the fact that they must wait by, and watch carefully for the pot that contains their food to begin boiling to begin the next step of the cooking process. If they are distracted, or have other things to do, the pot can "boil over," meaning that the water, and its contents, are being spilled from the pot onto the top of the stove. Practically anyone who has cooked spaghetti can attest to this occurrence. Usually, it's not a significant problem, but if other ingredients are present in the boiled water, it can create quite a mess. In addition to the "boil-over" scenario, which while inconvenient, is not particularly hazardous, a more ominous event can occur if someone puts a lid on the pot, then walks away, and is distracted. If enough time passes, the liquid can boil away, and heat can build up in the pot and lid to the point that it becomes a fire/safety hazard. If enough time passes, the entire pot and lid can glow red from heat, and cause combustion to occur in nearby items, leading to a catastrophic situation.

However, while there are some known devices that can alert people to the condition of water boiling in pots, each of these include shortcomings that prevent widespread use and acceptance.

Thus, while attempts have been made to correct the problem of not having a means for alerting a person that a pot with boiling liquid therein has reached the boiling stage, there are certain problems and deficiencies with all of the prior art devices for creating a whistling lid for a pot. Accordingly, it would be desirable to provide methods, modes and systems for a safe, but effective lid for a pot that alerts the user that the liquid contained therein has achieved a state of boiling.

SUMMARY

An object of the embodiments is to substantially solve at least the problems and/or disadvantages discussed above, and to provide at least one or more of the advantages described below.

It is therefore a general aspect of the embodiments to provide a pot and whistling lid assembly and/or standalone lid that will obviate or minimize problems of the type previously described.

According to a first aspect of the embodiments, a whistling lid assembly, is provided comprising a lid, a first hole formed in the lid, and a whistle assembly attached to the lid about the first hole in the lid, the whistle assembly comprising—a lower disc, the lower disc having a lower disc hole, an upper disc with an upper disc hole, and an outer wall surrounding outer radius surfaces of both the lower and the upper discs, and wherein when steam passes through the first hole in the lid to the whistle assembly, a whistling noise is generated through interaction between the steam, the lower disc hole and the upper disc hole.

According to the first aspect of the embodiments, the whistling lid further comprises a pot adapted to retain solid and liquid contents and upon which the lid assembly is adapted to sit upon; a rim located on an upper surface of the pot, and a lid handle located on an upper surface of the lid of the lid assembly, and wherein the whistle assembly is in fluid communication with the pot through the first hole.

According to the first aspect of the embodiments, the lid handle is adapted to be substantially resistant to a flow of heat from the lid, and the lid handle is made from at least one of plastic and ceramic.

According to the first aspect of the embodiments, the lid assembly further comprises a lid sealing member adapted to provide a substantially impermeable gaseous sealing interface between gaseous contents of the pot and the lid assembly, and the lid sealing member is arranged at an angle of about 10° with respect to a plane formed by a surface of the rim of the pot, and further wherein, the lid sealing member is annulus shaped such that a first widest diameter of the lid sealing member can substantially impermeably gaseously seal a first widest diameter pot such that substantially no liquid and gas in a gaseous state can escape from the pot after sufficient heat has been applied to convert the contents from a liquid to a liquid/gas mixture, and further wherein a second smallest diameter of the lid sealing member can substantially impermeably gaseously seal a second narrowest diameter pot such that substantially no liquid and gas in a gaseous state can escape from the pot after sufficient heat has been applied to convert the contents from a liquid to a liquid/gas mixture, and still further wherein the lid sealing member is arranged at an angle ranging from about 0° to about 20°.

According to the first aspect of the embodiments, the whistling lid assembly further comprises a rocker arm located on the lid handle, wherein the rocker arm is adapted to move from a first, non-steam interfering position to a second, steam interfering position, such that when in the first, non-steam interfering position, the rocker arm does not affect the outward flow of steam from the pot, allowing a whistle sound to be generated, and further wherein when the rocker arm is moved to a second, steam interfering position, the rocker arm effectively blocks substantially all of the steam escaping from the upper disc hole, thereby preventing the whistling sound.

According to the first aspect of the embodiments, the rocker arm further comprises a plug adapted to be appropriately sized to be received by the upper disc hole and thereby substantially block the flow of all of the steam from upper disc hole.

According to a second aspect of the embodiments, a whistling lid assembly is provided, comprising a lid, a first hole formed in the lid, and a whistle assembly attached to the lid assembly about the first hole in the lid, the whistle assembly comprising—a whistle body adapted to be attached to the lid at the first hole in the lid to form a substantially impermeable gaseous sealing barrier, a whistle insert adapted to be attached to an uppermost part of the whistle body, the whistle insert comprising a second hole, and a whistle cap adapted to be attached over both of the whistle body and whistle insert in an interface region to form a substantially impermeable gaseous sealing barrier to prevent gases from escaping the interface region, the whistle cap further comprising a third hole, and wherein when steam passes through the first hole in the lid to the whistle assembly, a whistling noise is generated through interaction between the steam, the second hole and the third hole.

According to the second aspect of the embodiments, the whistling lid assembly further comprises a baffle assembly adapted to interface with both of the whistle insert and whistle cap to substantially allow the flow of steam, thereby allowing whistle noise generation, and to substantially prevent the flow of steam thereby substantially preventing whistle noise generation, upon being moved between a first position and a second position.

According to the second aspect of the embodiments, the baffle assembly comprises a baffle body, a baffle whistle hole, and a baffle sliding slot, wherein the baffle assembly is adapted to slide in both a first direction and a second direction, opposite to the first direction, and wherein when the baffle assembly is slid in a first direction, the baffle whistle hole is in substantial alignment with the second hole to substantially allow steam to escape, causing the whistle sound, and further wherein when the baffle assembly is slid in a second direction, the baffle whistle hole is not in substantial alignment with the second hole, thereby substantially preventing steam from escaping, and substantially preventing the whistle sound from being produced.

According to the second aspect of the embodiments, the whistle insert comprises a first and second whistle insert baffle channel, and wherein the whistle cap comprises a first and second whistle cap baffle channel, and further wherein in assembly, the first and second whistle insert baffle channels are substantially aligned with respective ones of the first and second whistle cap baffle channels, and further wherein the baffle assembly is extend through and slide within both of the first and second whistle insert baffle channels and the first and second whistle cap baffle channels.

According to the second aspect of the embodiments the baffle assembly further comprises a baffle retention pin adapted to retain the baffle to the whistle insert, wherein the baffle retention pin is further adapted to fit within the baffle sliding slot and be retained by an insert pin hole located on the whistle insert.

According to the second aspect of the embodiments, the whistling lid assembly further comprises a pot adapted to retain solid and liquid contents, and further adapted to form a substantially impermeable gaseous sealing barrier with the lid.

According to the second aspect of the embodiments, the substantially impermeable gaseous sealing barrier between the lid and the pot comprises a first plurality of first interlock mechanisms formed on an upper surface of the pot, and a second plurality of second interlock mechanisms formed on a lower surface of the lid, and wherein the first and second interlocking mechanisms are adapted to interface with each other to form the substantially impermeable gaseous sealing barrier between the lid and the pot when a user twists the lid relative to the pot in such a manner that the first interlock mechanisms fit within a receptacle of the second interlock mechanisms and cause the lid to be pulled down against the upper surface of the pot.

According to the second aspect of the embodiments, the substantially impermeable gaseous sealing barrier between the lid and the pot comprises a gasket located substantially completely about a lower surface of the lid.

BRIEF DESCRIPTION OF THE DRAWINGS

The above and other objects and features of the embodiments will become apparent and more readily appreciated from the following description of the embodiments with reference to the following Figures, wherein like reference numerals refer to like parts throughout the various Figures unless otherwise specified, and wherein:

FIG. 9B illustrates a close-up perspective sectional view of the whistle assembly of FIG. 9B.

FIG. 11 illustrates a top view of a whistle insert 904 used in the whistle lid assembly of FIG. 9A according to aspects of the embodiments.

FIG. 12 illustrates a side view of the whistle insert 904 of FIG. 11.

FIG. 13 illustrates a top perspective view of the whistle insert of FIG. 11.

FIG. 14A illustrates a top view of a baffle assembly 906 used in the whistle lid assembly of FIG. 9A according to aspects of the embodiments.

FIG. 14B illustrates a side view of the baffle assembly 906 of FIG. 14A.

FIG. 22 illustrates a top perspective view of a lid 806 used in the pot and whistling lid assembly 800 of FIG. 8 according to aspects of the embodiments.

FIG. 23 illustrates a bottom perspective view of the lid 806 of FIG. 22.

DETAILED DESCRIPTION

Figure 1:
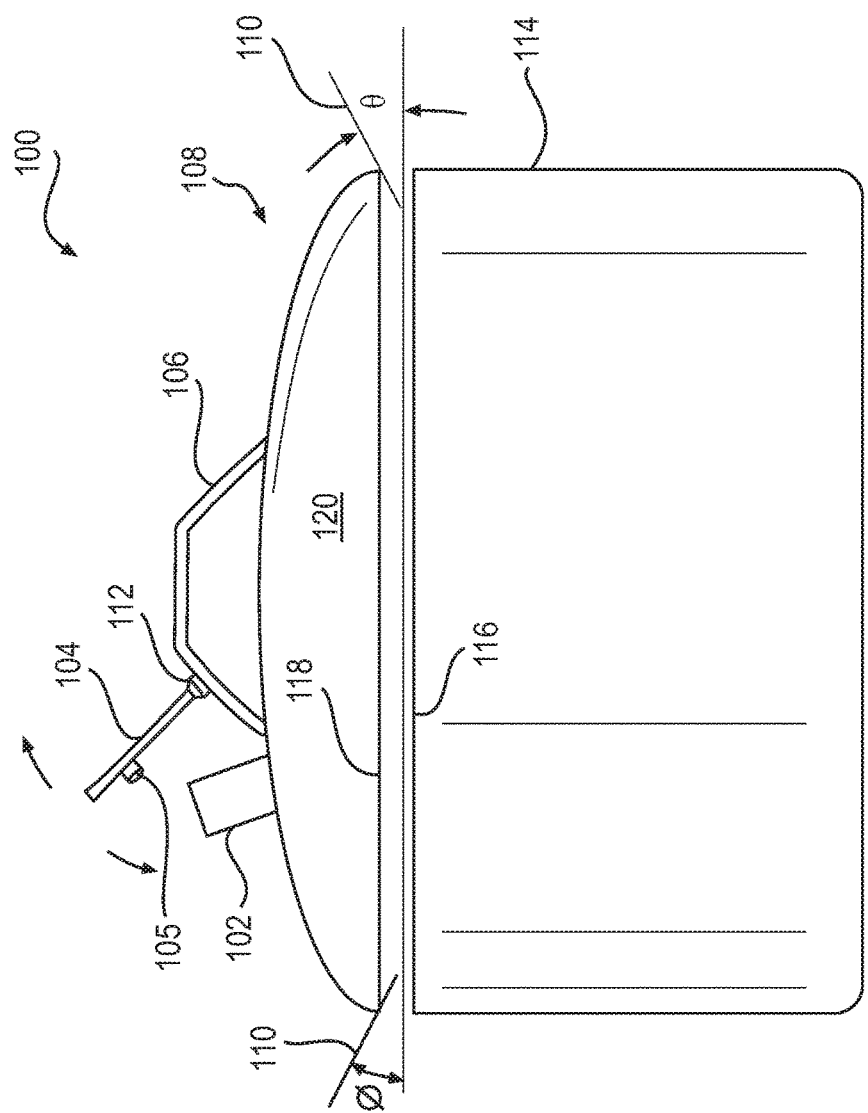
FIG. 1 illustrates a pot and whistling lid assembly according to an embodiment.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The following embodiments are discussed, for simplicity, with regard to the terminology and structure of a pot and lid assembly for use in a kitchen. However, the embodiments to be discussed next are not limited to these systems but may be applied to other cooking and heating assemblies that are affected by problems associated with boiling-over effects.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

The following is a list of the elements of the Figures in numerical order:

100 Pot and Whistling Lid Assembly
102 Whistle Assembly
104 Rocker Arm
105 Plug
106 Lid Handle
108 Lid Assembly
110 Lid Sealing Member
112 Rocker Arm Hinge
114 Pot
116 Pot Rim
118 Lid Rim
120 Lid
302 Lower Disc
304 Upper Disc
306 Lid Hole
308 Outer Wall
310 Lower Disc Hole
312 Upper Disc Hole
314 First (Lower) Chamber
316 Second (Upper) Chamber
402 Pot Steam
404 Upper Chamber Steam
406 Whistle Steam
502 Rocker Arm, Further Embodiment
504 Upper Disc, Further Embodiment
506 Rocker Arm Receptacle
602 Lower Chamber Sound Waves
604 Upper Chamber Sound Waves
606 Whistle Sound Waves
702 First Weld Lip
704 Second Weld Lip
800 Pot and Whistle Assembly
802 Pot Assembly (Pot)
804 Pot Handle Assembly
806 Lid
808 Lid Handle
810 Whistle Assembly
812 Screws
902 Whistle Body
904 Whistle Insert (Insert)
906 Baffle Assembly (Baffle)
908 Baffle Retention Pin (Pin)
910 Whistle Cap
1102 Insert Whistle Hole (Hole)
1104 Insert Pin Hole (Pin Hole)
1106 Baffle Slide-Through Channel (Channel)
1108 Flat Bottom Portion (Bottom)
1110 Wall Portion (Wall)
1402 Baffle Body
1404 Baffle Holder
1406 Whistle Hole (Hole)
1408 Baffle Sliding Slot (Slot)

1802 Whistle Cap Body (Cap Body)
1804 Whistle Cap Baffle Channel (Cap Channel)
1806 Whistle Cap Hole (Cap Hole)
2002 Bottom Portion Pot Assembly
2004 Middle Portion Pot Assembly
2006 Top Portion Pot Assembly
2008a-n Pot-Lid Interlock Protrusion
2202a-n Lid-Pot Interlock Protrusion
2204 Whistle Assembly Hole
2206 Lid Handle Hole
2802 Gasket The following is a list of acronyms used herein in alphabetical order:

$WC_{ID}$ Whistle Cap Inner Diameter
$WB_{OD}$ Whistle Body Outer Diameter
$WI_{OD}$ Whistle Insert Outer Diameter FIG. 1 illustrates pot and whistling lid assembly 100 according to an embodiment. As shown in FIG. 1, pot and whistling lid assembly 100 comprises pot 114, and lid assembly 108. Pot 114 can be any conventional pot or pan for use on a stove top or any type of cooking surface, including, but not limited to gas, electric, and open-flame environments (e.g., for use when camping). Pot 114 can be made of any type of material that is in use presently, or can be used in the future, including, but not limited to ceramic, cast iron, stainless steel, Teflon-covered surfaces pots, among others. Lid assembly 108 comprises, according to an embodiment, lid handle 106, whistle assembly 102, rocker arm 104, rocker arm hinge 112, lid sealing member 110, lid 120, and lid rim 118. In operation, pot and whistling lid assembly 100 works much like any other pot and lid for boiling liquids to cook food items, with the exception of the whistle provided by whistle assembly 102 when the liquid boils according to an embodiment. That is, a liquid is placed in pot 114, perhaps with food items, and sealing member 110 (discussed in greater detail below) forms a sealing surface between pot 114 and lid assembly 108 when lid assembly 108 is placed on pot 114. Heat is then applied, in the expectation of boiling the liquid (not shown in either of FIGS. 1 and 2).

Figure 2:
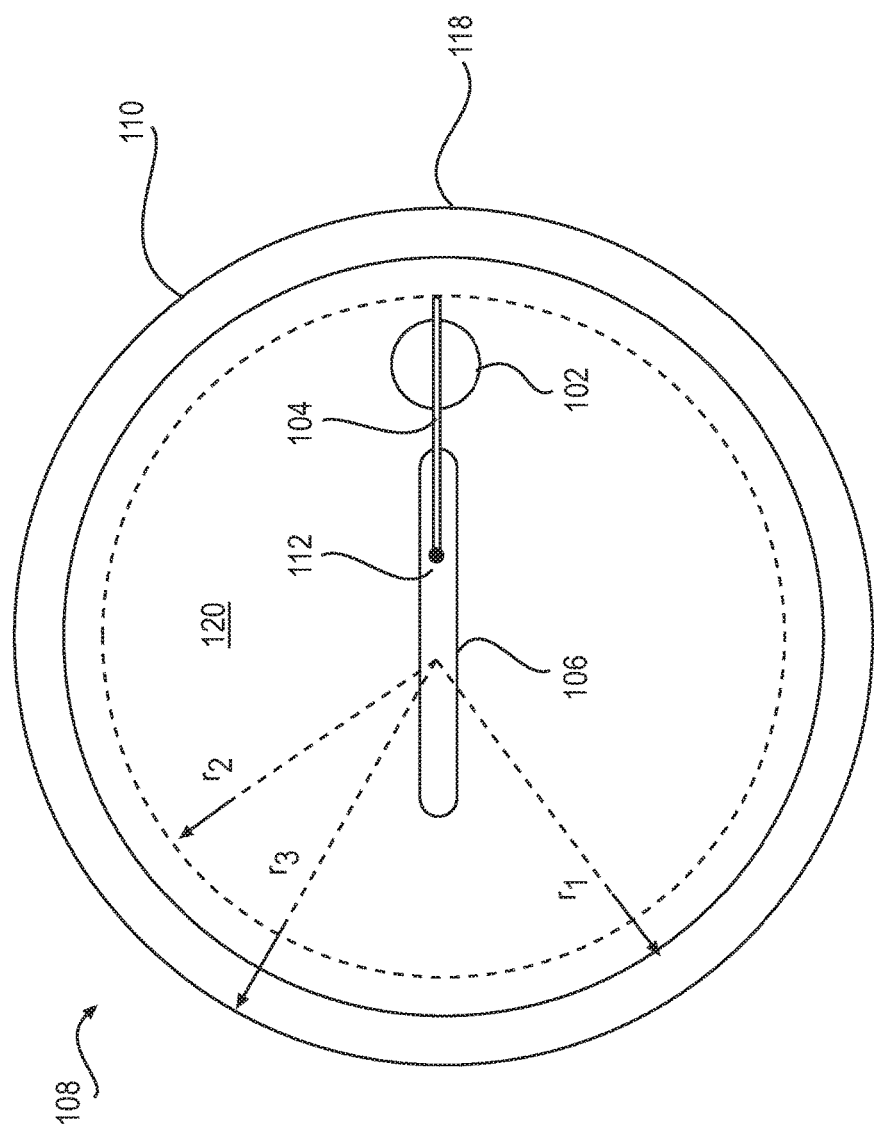
FIG. 2 illustrates a top view of a whistling lid assembly according to an embodiment.

As shown in FIG. 1, lid assembly 108 includes lid sealing member 110, located on lid rim 118 of lid 120, which according to an embodiment, forms a substantially gaseous impermeable sealing arrangement between pot rim 116 and lid assembly 108 in order to prevent steam (which can contain both liquid and vapour forms of the boiling liquid) from escaping pot and whistling lid assembly 100 when the liquid contained therein is boiling. As those of skill in the art can appreciate, pot 114 is generally shaped like a cylinder, and thus from a top view, as shown in FIG. 2 and discussed below, is substantially circular, though this need not always be the case. That is, pot 114 and lid assembly 108 can be practically any shape (cube, pyramid, among others). However, in fulfilment of the dual purposes of clarity and brevity, reference is made to, and the Figures show, an embodiment of pot and whistling lid assembly 100 that is cylindrical in shape, and thus from a top or bottom view, appears substantially circular.

As discussed in regard to all of the Figures herein, reference is made to several dimensions, including several radii, angles, height, among others. Those of skill in the art can appreciate that although examples of dimensions are provided, these should not be taken in a limiting manner; that is, the aspects of the embodiments are not to be construed as defined or limited by the specific example of the dimensions shown and discussed, but instead are provided merely for illustrating an example of what a device that incorporates the aspects of the embodiments could, in a non-limiting manner, look like. Furthermore, as those of skill in the art can appreciate, since the aspects of the embodiments are directed towards a physical object, with dimensional characteristics, all of the parts will have various dimensions, some of which are not shown in fulfilment of the dual purposes of clarity and brevity. According to still further aspects of the embodiments, some of these objects will have dimensional characteristics that lend themselves to aesthetic aspects; in fulfilment of the dual purposes of clarity and brevity, dimensions in this regard have also been omitted. Therefore, as the aspects of the embodiments are directed towards a whistling lid for pots used for cooking, it is to be understood that the dimensions of the different objects, some dimensions shown, some dimensions not shown, will be understood by those of skill in the art.

As shown in FIG. 2, lid assembly 108 has a first radius $r_1$, and lid sealing member 110 extends about the periphery of lid assembly 108 as shown in FIGS. 1 and 2, extending from a first radius $r_2$ to a second radius $r_3$. That is, sealing member 110, which is annulus shaped, has a width that is equal to the difference between $r_2$ and $r_3$, and can be, according to an embodiment, substantially symmetrically located about the lower portion of a lid assembly 108, at lid rim 118. According to aspects of the embodiments, lid assembly 108 can be fabricated to fit pots of many different dimensions, ranging from one quart saucepans (or even smaller) to pots that can hold 2 gallons (or more, for use, by way of example, in large cooking facilities, such as banquet halls, ships, or prisons). As such, the dimensions shown in regard to FIG. 1 are given in regard to but just one of many different pots/saucepans that can use lid assembly 108 according to an embodiment. Therefore, one of skill in the art can appreciate that such example dimensions are not to be taken in a limiting manner, and should not be construed as anything but as non-limiting. Thus, according to one, non-limiting example of lid assembly 108 radius $r_1$ can be about 4.25", and according to a further embodiment, $r_1$ ranges from about 4.00" to about 4.50". According to an embodiment, radius $r_2$ is about 3.75", and according to a further embodiment, $r_2$ ranges from about 3.50" to about 4.00". According to an embodiment, radius $r_3$ is about 4.75", and according to a further embodiment, $r_3$ ranges from about 4.50" to about 5.00". According to a further embodiment, sealing member 110 can be formed at an angle of about 0, as shown in FIG. 2, which can range from about 0° to about 20°. According to an embodiment, lid sealing member 110 can have a width of between 0" (i.e., no lid sealing member 110 for a lid assembly 108 that is a substantially exact fit with the diameter opening of pot 114), to about 1". According to an embodiment, lid sealing member 110 can be made from heat resistant hard foam, plastic, or high-temperature silicone rubber, among other materials. By providing lid sealing member 110 with a width of about 1", and locating it appropriately on lid assembly 108, lid assembly 108 can be used with several different pots 114 of differing diameters. The benefit, as those of skill in the art can appreciate, is to reduce costs in owning different pot and lid assemblies 100 according to embodiments.

Figure 3:
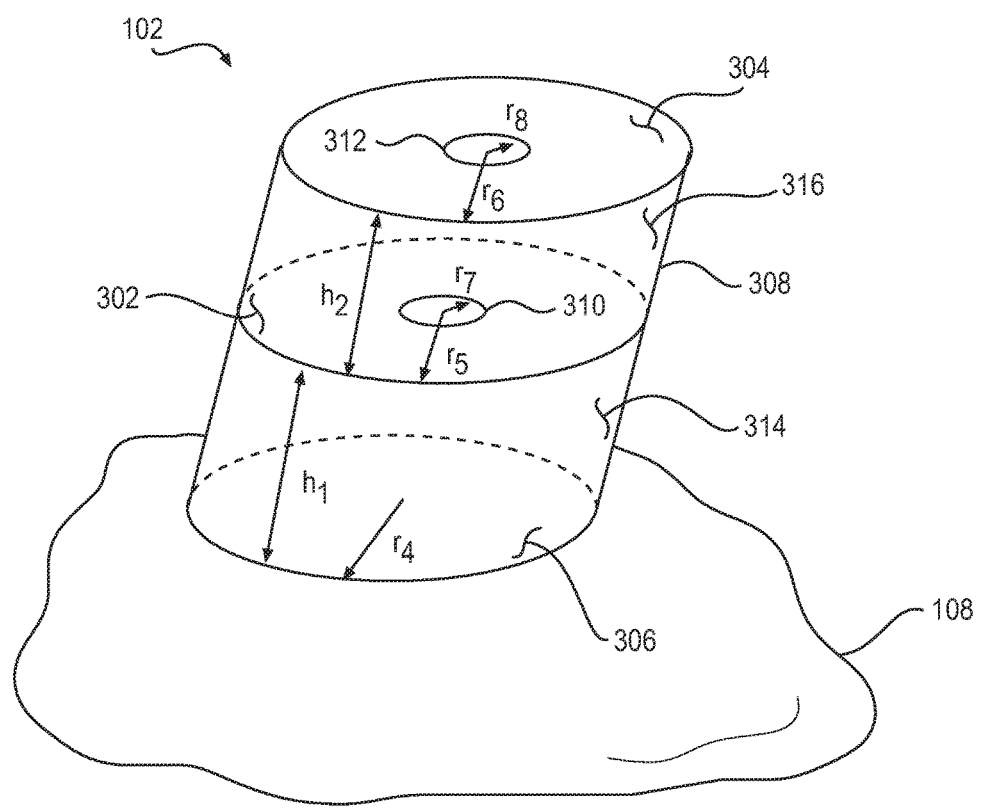
FIG. 3 illustrates a whistle assembly for use with the pot and lid assembly of FIGS. 1 and 2 according to an embodiment.
Figure 7A:
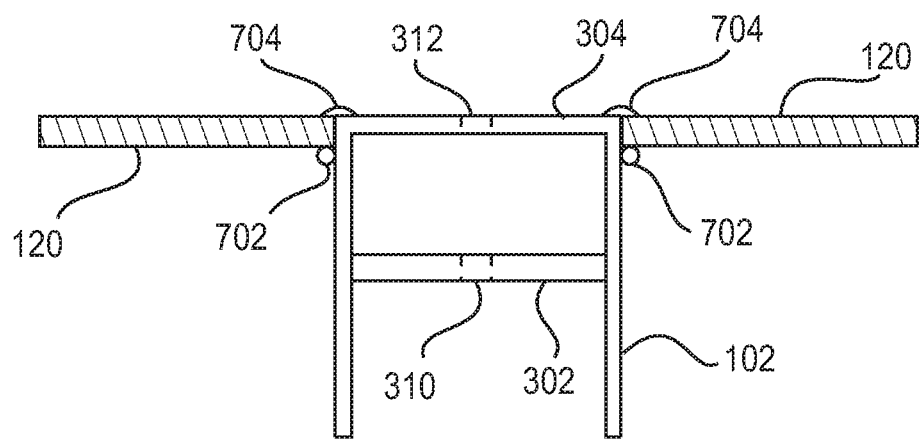
FIGS. 7A and 7B illustrate additional embodiments of whistle assembly 102 attached to lid 120.
Figure 7B:
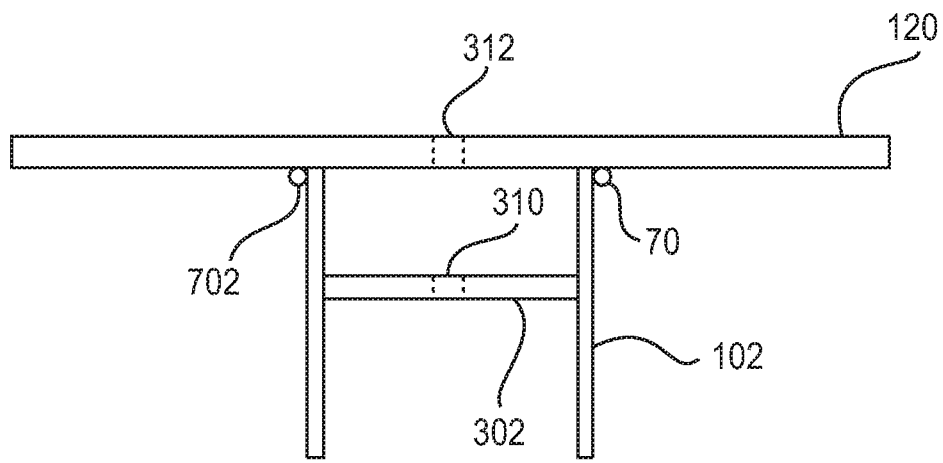

FIG. 3 illustrates a side perspective view of whistle assembly 102 for use with pot and lid assembly 100 of FIGS. 1 and 2 according to an embodiment. As those of skill in the art can appreciate, whistle assembly 102 can be fabricated in a separate process apart from the remaining components of lid 120 and lid assembly 108, and joined together with lid 120 according to one of several different processes that are known to those of skill in the art. By way of one non-limiting example, whistle assembly 102 can be joined to an upper surface of lid 120 using a welding process, that would leave a small, but finite lip (not shown in FIG. 3) on a lower interior surface of whistle assembly 102 where it is joined with lid 120. In another non-limiting example, shown in FIG. 7A, whistle assembly 102 can be joined to a bottom surface of lid 120 (such that the top of the whistle assembly is flush with the top of the lid) using a welding process, that would leave a small, but finite lip 702, 704, on a upper exterior surface of whistle assembly 102 where it is joined with lid 120. According to still a further non-limiting example, shown in FIG. 7B, a partial assembly of whistle assembly 102 that does not include upper disc 304 can be attached to a lower surface of lid 120; in this case, "upper disc hole" 312 would be drilled or pressed directly into lid 120, and the partial assembly of whistle assembly 102 (all the remaining parts) would then be welded about the drilled/pressed-out upper disc hole 312 such that a weld would leave a small, but finite lip 702 on an upper exterior surface of whistle assembly 102 and a lower surface of lid 120.

In FIGS. 1, 2 and 3, whistle assembly 102 is shown as being slightly conical in shape, but according to a further embodiment, can be substantially cylindrically in shape. Whistle assembly 102 includes lower disc 302, upper disc 304, outer wall 308, and lid hole 306. When assembled, as shown in FIG. 3, whistle assembly 102 further includes first (lower) chamber 314, and second (upper) chamber 316.

Lid hole 306 is formed in lid assembly 108 at an appropriate location, which is discussed in greater detail below, in regard to FIGS. 4A and 4B. In fulfilment of the dual purposes of clarity and brevity, discussion shall be made to an embodiment of whistle assembly 102 that is conical in shape, wherein the base, or lid hole 306, which forms the outer radius of outer wall 308 as it is connected or attached to the surface of lid assembly 108, has a slightly greater radius than the uppermost portion of whistle assembly 102, which is upper disc 304. However, as those of skill in the art can appreciate, whistle assembly 102 need not be conical in shape; it could be, by way of non-limiting example, substantially cylindrical, meaning all of the radii of lid hole 306, lower disc 302 and upper disc 304 are all substantially equal, or whistle assembly 102 can be pyramid or prism shaped, among other shapes. Each of the components of whistle assembly 102 will now be discussed in greater detail.

Discussed below are details concerning several dimensions and aspects of whistle assembly 102. FIG. 6, which is discussed in greater detail below, illustrates the generation of sound and pressure waves within whistle assembly as shown in FIG. 3. FIG. 6 is taken from a paper entitled "The Aeroacoustics of a Steam Kettle," by R. H. Henrywood et al., Engineering Department, University of Cambridge, Trumpington Street, Cambridge CB2 1PZ, United Kingdom published online 3 Oct. 2013 (herein after referred to as "the Aeroacoustics paper"). According to the Aeroacoustics paper, several of the dimensions of whistle assembly 102 are required to be kept within a range of values in order to produce an audible whistle sound, while some of the dimensions are merely aesthetically related, or for the convenience of manufacture, as those of skill in the art can appreciate. As with the descriptions of FIGS. 1 and 2 above, of any of the Figures described herein, any dimensions shown and discussed with respect to FIGS. 3, 4, 5, and 6 (and any others) should be considered to be by way of non-limiting examples only, unless otherwise described as being of concern with the generation of the whistle as described in the Aeroacoustics paper.

According to the Aeroacoustics paper, several key conclusions were determined, in the generation of a whistle using the configuration shown in FIG. 3. The whistling frequency produced by FIG. 3 is a function of several variables including $h_1$, $h_2$, $r_4$, $r_5$, $r_6$, $r_7$, $r_8$, the jet velocity of the steam, the speed of sound, and the kinematic viscosity of air. The whistling frequency (tone) scales directly with the jet velocity of the steam and inversely with disc separation $h_2$ shown in FIG. 3. The practical implications for the aspects of the embodiments is that a higher frequency whistle tone, $f_W$, can be achieved by shortening the distance $h_2$ and a lower frequency whistle tone can be achieved by elongating the distance $h_2$ in FIG. 3. That is—

$$f_{W\text{-}Short(h_2)} > f_{W\text{-}Long(h_2)} \tag{1},$$

and only a ratio of—

$$\frac{h_2}{2 \times r_7} < 5, \tag{2}$$

produces a clear audible whistle tone. When the ratio shown in Equation (2) is greater than 5, the disc separation, $h_2$, that is, the distance between upper disc 304 and lower disc 302, is too great and steam 604 in upper chamber 316 experiences too much turbulence to produce a clear, audible tone. It should be noted for the above conclusions that the Aeroacoustics paper used a substantially cylindrical design (i.e., $r_4 \approx r_5 \approx r_6$, and $r_7 \approx r_8$), but this behavior can be applied to a slightly conical shape as well.

Also discussed within the Aeroacoustics paper is the relationship between the whistling frequency, $f_W$, and $r_4$, the radius of lid hole 306. According to the Aeroacoustics paper, there is an inverse relationship between $f_W$ and $r_4$. However, at very small whistle cavity sizes of $r_4$, the relatively constant Strouhal number behaviour is greater than the constant frequency behaviour caused by the whistle mechanism, effectively rendering the whistle tone inaudible at small values of $r_4$. As noted above, the Aeroacoustics paper used a substantially cylindrical design (i.e., $r_4 \approx r_5 \approx r_6$, and $r_7 \approx r_8$), but this behaviour can be applied to a slightly conical shape as well.

Still further, the Aeroacoustics paper shows that the whistling frequency $f_W$ has an inverse relationship with $h_1$ at values where—

$$30 < \frac{h_1}{2 \times r_7} < 60. \tag{3}$$

Outside of this range of values, the whistling tone becomes inaudible. As noted above, the Aeroacoustics paper used a substantially cylindrical design (i.e., r4≈r5≈r6. and r7≈r8), but this behavior can be applied to a slightly conical shape as well. The Aeroacoustics paper further explains that the relationship of variables that produces the loudest audible whistle occurred when—

$$\frac{r_8}{r_6} = \frac{1}{6.8}, \text{ and } \frac{r_6}{h_2} = \frac{6.8}{8.333}. \tag{4}$$

As noted above, the Aeroacoustics paper used a substantially cylindrical design (i.e., $r_4 \approx r_5 \approx r_6$, and $r_7 \approx r_8$), but this behaviour can be applied to a slightly conical shape as well.

Lid hole 306, formed in lid assembly 108, has a radius $r_4$, which, according to an embodiment, is substantially the same radius as that of outer wall 308 of whistle assembly 102. According to an embodiment, radius $r_4$ is about 0.677", and according to a further embodiment, $r_4$ ranges from about 0.65" to 0.70". Lid hole 306 opens up into first (lower) chamber 314. Lower chamber 314 has a height $h_1$, and is formed by outer wall 308 and lower disc 302. The distance between lower disc 302 and a surface of lid assembly 108 is $h_1$. According to an embodiment, $h_1$ is about 0.4". According to a further embodiment, $h_1$ ranges from about 0.6" to about 0.8". According to an embodiment, lower chamber 314 opens up into the space of pot 114 through lid hole 306, such that steam that is generated by the rapid vaporization of the liquid within pot 114 fills lower chamber 314. Steam, as those of skill in the art can appreciate, is the gaseous phase of liquid after it has been heated by applying energy to the liquid; when at normal temperatures and pressures (i.e., standard temperature and pressure), steam is a combination of water particle in liquid form and in gaseous form; as the steam is heated further (super-heated steam) all of the liquid changes to the gaseous phase. This, though, is generally not the condition in which pot and whistling lid assembly 100 will be found to be operating in. Instead, the steam that drives whistle assembly 102 to create the whistling noise is the combination of the liquid (usually, but not necessarily water) and gas phases. The generation of the whistling sound emitted by pot and whistling assembly 100 is described below in greater detail with respect to FIG. 6.

Whistle assembly 102 further comprises second (upper) chamber 316, that is formed by lower disc 302, outer wall 308, and upper disc 304. The distance between lower disc 302 and upper disc 304 is $h_2$. According to an embodiment, $h_2$ is about 0.4". According to a further embodiment, $h_2$ ranges from about 0.3" to about 0.5". Lower disc 302 is substantially circular, and has a radius $r_5$. According to an embodiment, radius $r_5$ is about 0.5", and according to a further embodiment, $r_5$ ranges from about 0.47" to 0.53". Upper disc 304 is substantially circular, and has a radius $r_6$. According to an embodiment, radius $r_6$ is about 0.4665", and according to a further embodiment, $r_6$ ranges from about 0.45" to about 0.48". According to a further embodiment, each of discs 302, 304 are about 0.04" in thickness, and according to further aspects of the embodiments, can range from about 0.03" to about 0.05" in thickness. Thus, according to an aspect of the embodiments, whistle assembly 102 has a height that can be about 1$\frac{7}{32}$", and according to further aspects of the embodiments, can range from about 0.96" to about 1.4" in height.

As shown in FIG. 3, both lower disc 302 and upper disc 304 include holes. Lower disc hole 310 has a radius $r_7$, and upper disc hole 312 has a radius $r_8$. According to an embodiment, $r_7$ of lower disc hole 310 is about $\frac{2}{32}$", but can range from about 1.75/32" to about 2.25/32", and $r_8$ of upper disc hole 312 is about 2.5/32", but can range from about 2.25" to about 2.75/32". Thus, according to an embodiment, the ratio of radii of first-to-second holes 310, 312 is about 4/5, but can range from about 3/5 to about 6/5. As those of skill in the art can appreciate, all of holes 306, 310, and 312 are substantially circular in order to provide the most efficient means for generating a whistle noise, as described in greater detail below in regard to FIG. 6.

Figure 4B:
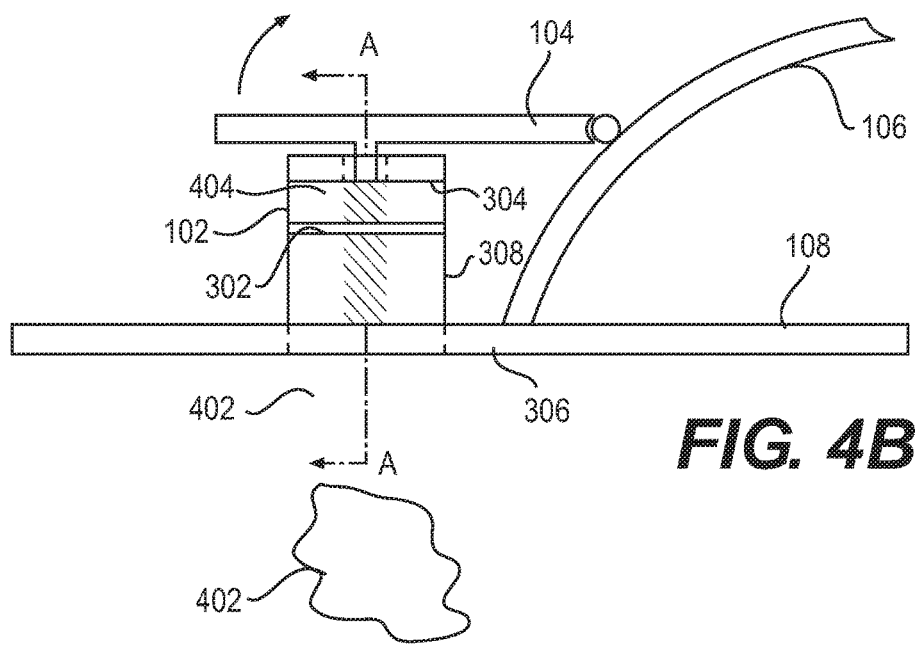
FIG. 4B illustrates a closed mode view of the whistle assembly of FIGS. 1, 2, and 3 with the rocker arm in an closed position according to an embodiment.
Figure 4A:
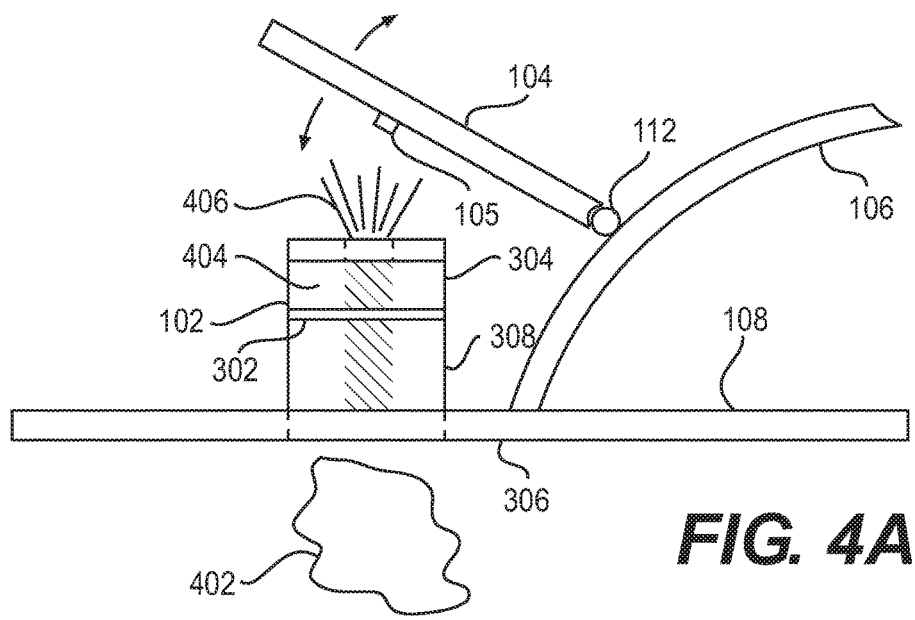
FIG. 4A illustrates a whistling mode view of the whistle assembly of FIGS. 1, 2 and 3 with a rocker arm in an open position according to an embodiment.

FIG. 4A illustrates a whistling mode view of whistle assembly 102 of FIGS. 1, 2, and 3 with rocker arm 104 in an open position according to an embodiment, and FIG. 4B illustrates a closed mode view of whistle assembly 102 of FIGS. 1, 2, and 3 with rocker arm 104 in an closed position according to an embodiment. As those who have ever boiled water in a tea kettle have experienced, the whistle generated from the spout of the tea kettle can be noticeably annoying; that, however, is its job—to alert the user that the water (or other liquid) has boiled, and to come to the stove. One of the first things many people will do, even before taking the tea kettle off the stove top is to activate the hinge mechanism that opens the spout, thereby stopping the whistling sound and releasing a significant amount of steam that has built up in the tea kettle. The same principle applies regardless of what type of liquid is boiling. So to with whistle assembly 102: there is a mechanism for alleviating the whistle noise generated by whistle assembly 102. Rocker arm 104, however, operates in a different manner than conventional whistling spouts, in that rocker arm 104 is moved into a position to stop the steam from escaping whistle assembly 102, thereby preventing the whistle sound from being generated. Rocker arm 104 includes, according to an embodiment, plug 105.

FIG. 4A, rocker arm 104 is in an open position; that is, according to an embodiment, frictional rocker arm hinge (hinge) 112 "locks" rocker arm 104 in an open position so that when boiling occurs, pot steam 402 is generated, which generates upper chamber steam 404, which in turn generates whistle steam 406, and whistling sounds results, generated by the boiling liquid in pot 114. The generation of whistling sounds is described in greater detail in regard to FIG. 6. Plug 105 on rocker arm 104 is shown in FIG. 4A. According to a further embodiment, hinge 112 can also be spring loaded so that it is normally open, as shown in FIG. 4A, and it will only temporarily close over whistle assembly 102 when sufficient downward force is applied to rocker arm 104. FIG. 4B illustrates rocker arm 104 in the closed position, whether by use of a frictional or spring loaded hinge 112. According to an embodiment, rocker arm 104 in the condition of FIG. 4B closes the path of the steam being emitted from whistle assembly 102 and upper disc hole 312 by causing plug 105 to be inserted into upper disc hole 312. A user could use their thumb to move rocker arm 104 down, stopping the whistling sound, and then simultaneously pick up the lid, releasing any steam build up in pot 114.

According to an embodiment, rocker arm 104 can be about the same size in width as the diameter of upper disc hole 312. According to a further embodiment, rocker arm 104 can be smaller in width than the diameter of upper disc hole 312, and according to a further embodiment, rocker arm 104 can be larger in width than the diameter of upper disc hole 312. According to an embodiment, as long as rocker arm 104 and plug 105 blocks a substantial amount of the steam emitted from upper disc hole 312, the whistling sound will not be generated.

Figure 5:
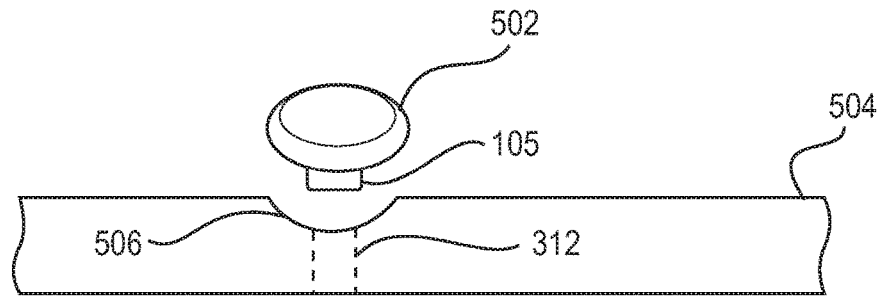
FIG. 5 illustrates a close-up side perspective view of a further embodiment of the rocker arm and lid according to an embodiment.
Figure 6:
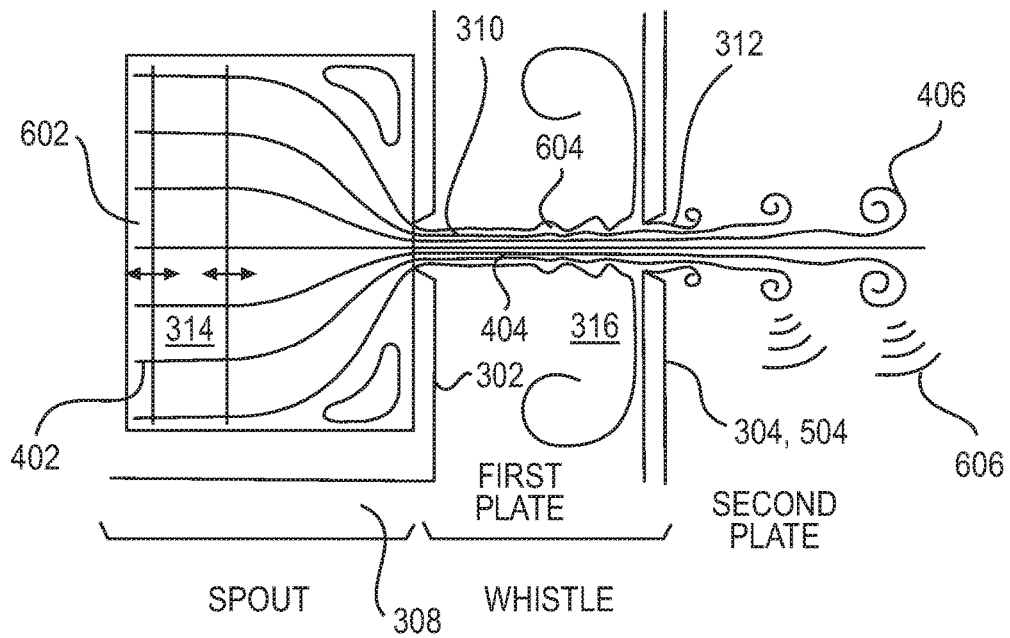
FIG. 6 is a diagram illustrating whistle sound generation formed by steam passing through two separate holes in two co-housed plates.

FIG. 5 illustrates a close-up cut-away view of rocker arm 502 according to a further embodiment, as well as upper disc 504 according to a further embodiment. FIG. 5 represents the view as indicated in FIG. 4B by lines A, with the difference that rocker arm 104 has been replaced by rocker arm 502, but still includes plug 105, and upper disc 304 has been replaced by upper disc 504. According to another aspect of the embodiments, rocker arm 502 can be made without plug 105. In FIG. 5, upper disc 504 still has upper disc hole 312, but upper disc 504 now has rocker arm receptacle 506. Rocker arm receptacle 506 is sized and shaped to accept rocker arm 502. According to the embodiment shown in FIG. 5, because rocker arm 502 is substantially circular in cross section (which means rocker arm 502 at the point where it interacts with upper disc 504) is a rod, or cylindrical in shape. However, rocker arm 502 is not limited to a cylindrical shape, and neither therefore would rocker arm receptacle; rocker arm 502 could be oval in cross sectional shape, it could be a square, or rectangular, or even flat, like a popsicle stick. According to further embodiments, rocker arm 502 could be triangular in cross sectional shape, or shaped like a regular or irregular prism (i.e., pentagon cross sectional shape, among many others). Regardless of what cross sectional shape rocker arm 502 takes, rocker arm receptacle 506 would be similarly shaped to appropriately receive rocker arm 502 and plug 105 can be appropriately sized to be received into upper disc hole 312 to substantially prevent the flow of steam from upper disc hole 312.

FIG. 6 is a diagram illustrating whistle sound generation formed by steam passing through two separate holes (lower disc hole 310, and upper disc hole 312) in two co-housed plates (lower disc 302 and upper disc 304, 504). In lower chamber 314, pot steam 402 is formed, as well as lower chamber sound waves 602 that resonate, depending on height $h_1$ of lower chamber 314. The flow of pot steam 402 contracts to pass through lower disc hole 310, forming a jet of steam, or upper chamber steam 404. In the second or upper chamber 316, sound waves 604 grow on the unstable jet of steam (upper chamber steam 404), which passes through upper disc hole 312. Vortices form on the output side of upper disc hole 312 on what is now referred to as whistle steam 406. The vortices 606 radiate sound at the frequency of the sound waves in lower chamber 314, leading to the whistling sound.

Figure 8:
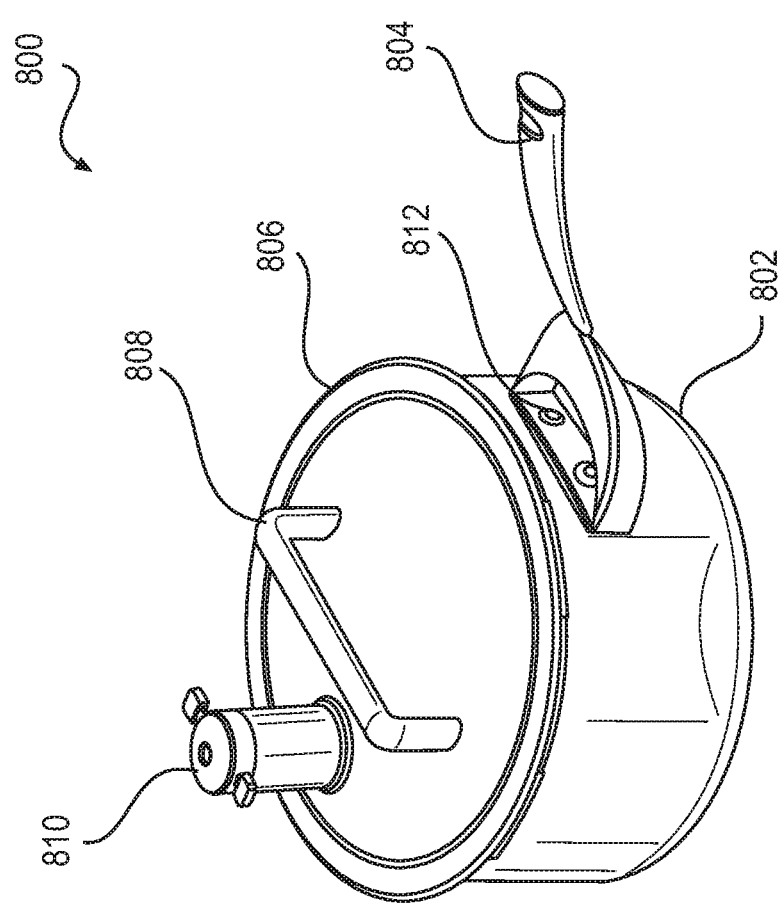
FIG. 8 illustrates a perspective view of a pot and whistling lid assembly 800 according to a further aspect of the embodiments.

Attention is now directed towards FIG. 8 that illustrates a perspective view of pot and whistling lid assembly (pot assembly) 800 according to a further aspect of the embodiments. Pot assembly 800 comprises pot assembly (pot) 802, pot handle assembly 804, lid 806, lid handle 808, whistle assembly 810, and screws 812, assembled in the manner and arrangement as shown in FIG. 8 according to aspects of the embodiments. A detailed discussion of the construction and fabrication and assembly of handle 804, lid and handle 804 are both not needed in regard to understanding the aspects of the embodiments, and beyond the scope of discussion herein, and therefore, in fulfilment of the dual purposes of clarity and brevity, such discussion has been omitted herein. However, as those of skill in the art can appreciate, known methods and materials can be used to fabricate these components, and assemble them together.

Figure 9A:
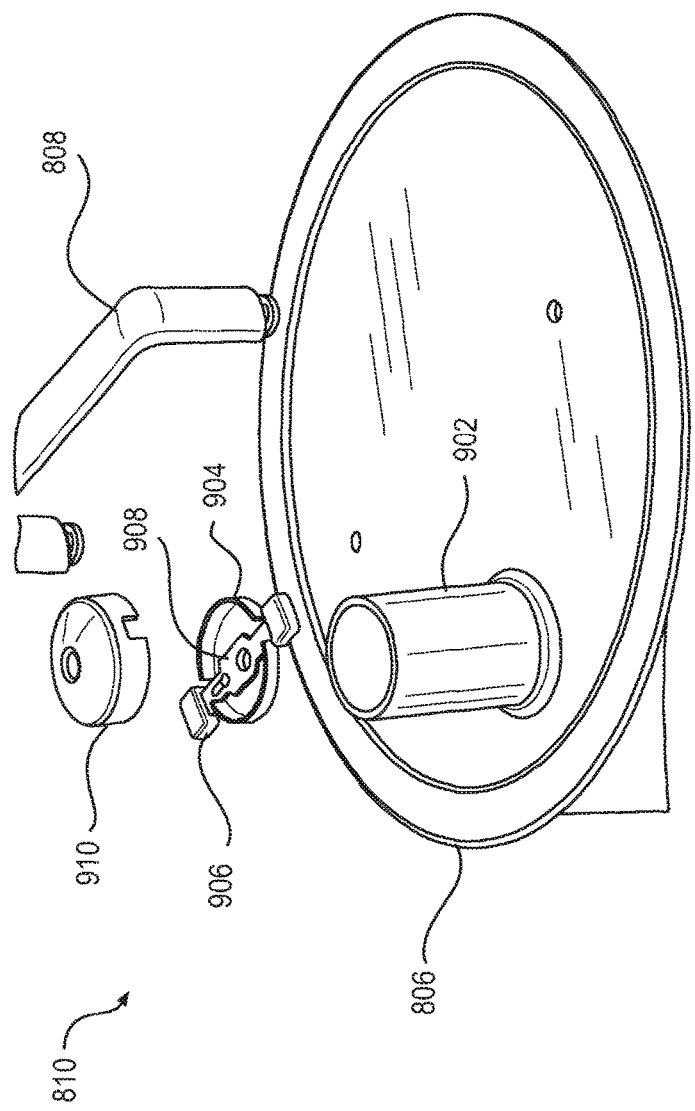
FIG. 9A illustrates an exploded perspective view of a whistle assembly 900 used in the pot and whistling lid assembly of FIG. 8 according to an aspect of the embodiments.
Figure 10:
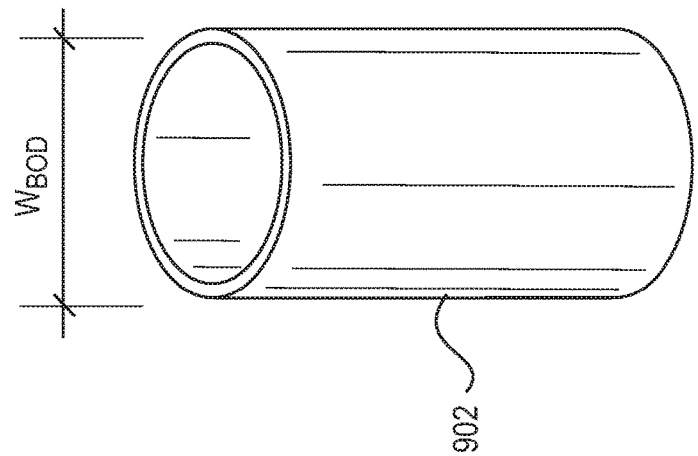
FIG. 10 illustrates a perspective view of a whistle body 902 used in the whistle lid assembly of FIG. 9A according to aspects of the embodiments.
Figure 9C:
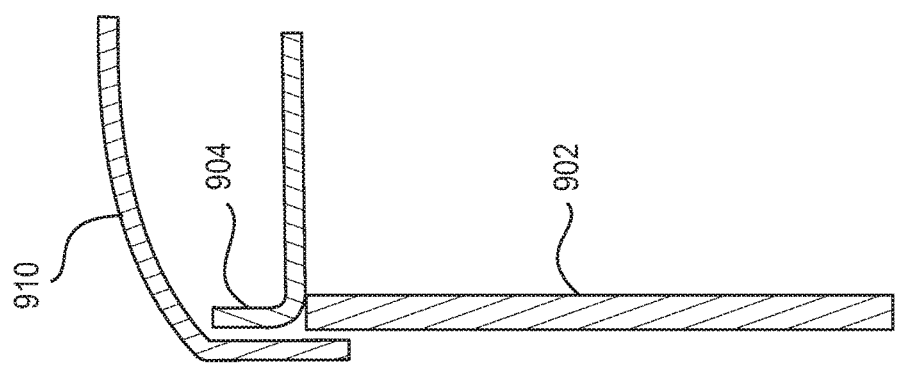
FIG. 9C illustrates a close-up sectional view of a portion of the whistle assembly of FIGS. 9A and 9B.
Figure 17:
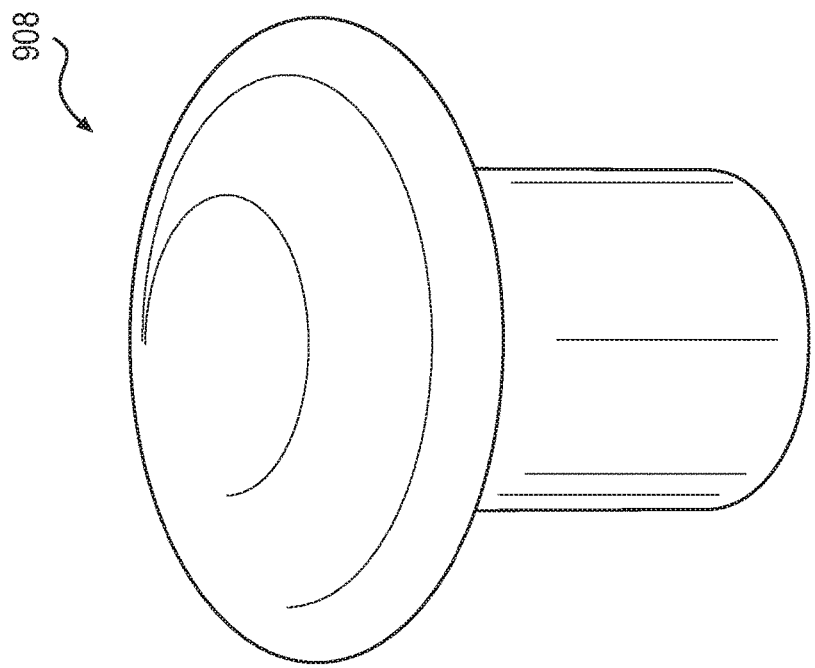
FIG. 17 illustrates a top perspective view of a baffle retention pin 908 used in the whistle lid assembly of FIG. 9A according to aspects of the embodiments.

FIG. 9A illustrates an exploded perspective view of whistle assembly 900 used in pot assembly 800 of FIG. 8 according to an aspect of the embodiments, FIG. 9B illustrates a close-up perspective sectional view of whistle assembly 900 of FIG. 9B, and FIG. 9C illustrates a close-up sectional view of a portion of whistle assembly 900 of FIGS. 9A and 9B. Referring now to FIG. 9A, whistle assembly 900 comprises whistle body 902 (a perspective view of which is shown in FIG. 10), whistle insert (insert) 904, baffle assembly (baffle) 906, baffle retention pin (pin) 908 (a perspective view of which is shown in FIG. 17), and whistle cap 910. Referring now to FIGS. 9A and 9B, it can be seen that in assembly, whistle body 902 is attached to lid 806 using any one of a number of known techniques for attachment, such as press-fitting, or welding, among others. In regard to the attachment of whistle body 902 to lid 806, and other components described herein, any and all such known manners and methods of attachment can be used, and since a detailed discussion of them are not necessary to understand the aspects of the embodiments, and beyond the scope of this discussion, the same has been omitted from herein in fulfilment of the dual purposes of clarity and brevity.

Attached to the top of whistle body 902 is insert 904. Insert 904 retains baffle 906 in a sliding manner, described below, through use of pin 908. Whistle cap 910 fits over insert 904 and the top-most portion of whistle body 902, in the manner shown in FIG. 9C, which is an exploded view of circle A of FIG. 9B. In manufacture, the outer diameters of insert 904 ($WI_{OD}$) and whistle body 902 ($WB_{OD}$), are smaller than the inner diameter of whistle cap 910 ($WC_{ID}$), such that whistle cap 910 can be affixed to the combined assembly of whistle body 902 and insert 904 in the manner shown in FIG. 9C, and attachment between the components can take place to secure them to each other.

In operation, whistle assembly 900 performs in a substantially similar manner as that previously described in regard to the aspect of the embodiments shown and described in regard to FIGS. 1-7; that is, steam is generated by the application of heat to the liquid inside the pot, and through the interaction of the steam and the body of 314 (in this case, whistle body 902) and the two holes (previously 310 and 312), vortices are generated out of whistle cap 910, and the whistle radiates at the frequency of the sound waves in the first (lower) chamber of whistle body 902. In the aspects of the embodiments shown in FIGS. 8-27, the manner of design of certain parts of these elements has changed, most noticeably the apparatus for stopping or preventing the flow of steam that causes the whistle sound. In these aspects of the embodiments, baffle 904 contains its own whistle hole that can be slid over or off-of a lower whistle hole to allow or prevent the flow of steam. This assembly and operation will now be described in greater detail.

Attention is now directed towards FIGS. 11-13, which illustrates different views of insert 904; as described above, insert 904 is designed and fabricated to be placed on top of whistle body 902, whereupon it can be attached using known means and methods that substantially prevent the escape the flow of gases through the interface between the two pieces, 902, 904. Insert 904 comprises a substantially flat bottom portion (bottom) 1108 and circumferential walls (walls) 1110*a,b*. Walls 1110*a,b* extend substantially around the entire substantially circular shape of insert 904, with the exception of two portions, which comprise baffle slide-through channels (channels) 1106*a,b*. Channels 1106*a,b* are dimensioned to allow the width of baffle 906 to slide through them in the manner shown and described in reference to FIG. 15, described below. Insert 904 further comprises insert whistle hole (hole) 1102 and insert pin hole (pin hole) 1104. Hole 1102 allows steam to escape, unless covered by a portion of baffle 906. Pin hole 1104 is used to hold and retain pin 908 which is placed through a slot on baffle 906 which limits the sliding motion of baffle 906. Pin 908 therefore has a slightly smaller diameter than the slot, described in greater detail below, and is attached to insert 904 through any one of known means and methods, the details of which have been omitted here from in fulfilment of the dual purposes of clarity and brevity. Shown in FIGS. 11-13 are numerous dimensions, as are shown in many of the Figures; those of skill in the art can appreciate that such dimensions are not to be taken in a limiting manner, and are included herein to illustrate just one of a plurality of embodiments that can be used to manufacture pot assembly 800 according to various aspects of the embodiments.

Figure 15:
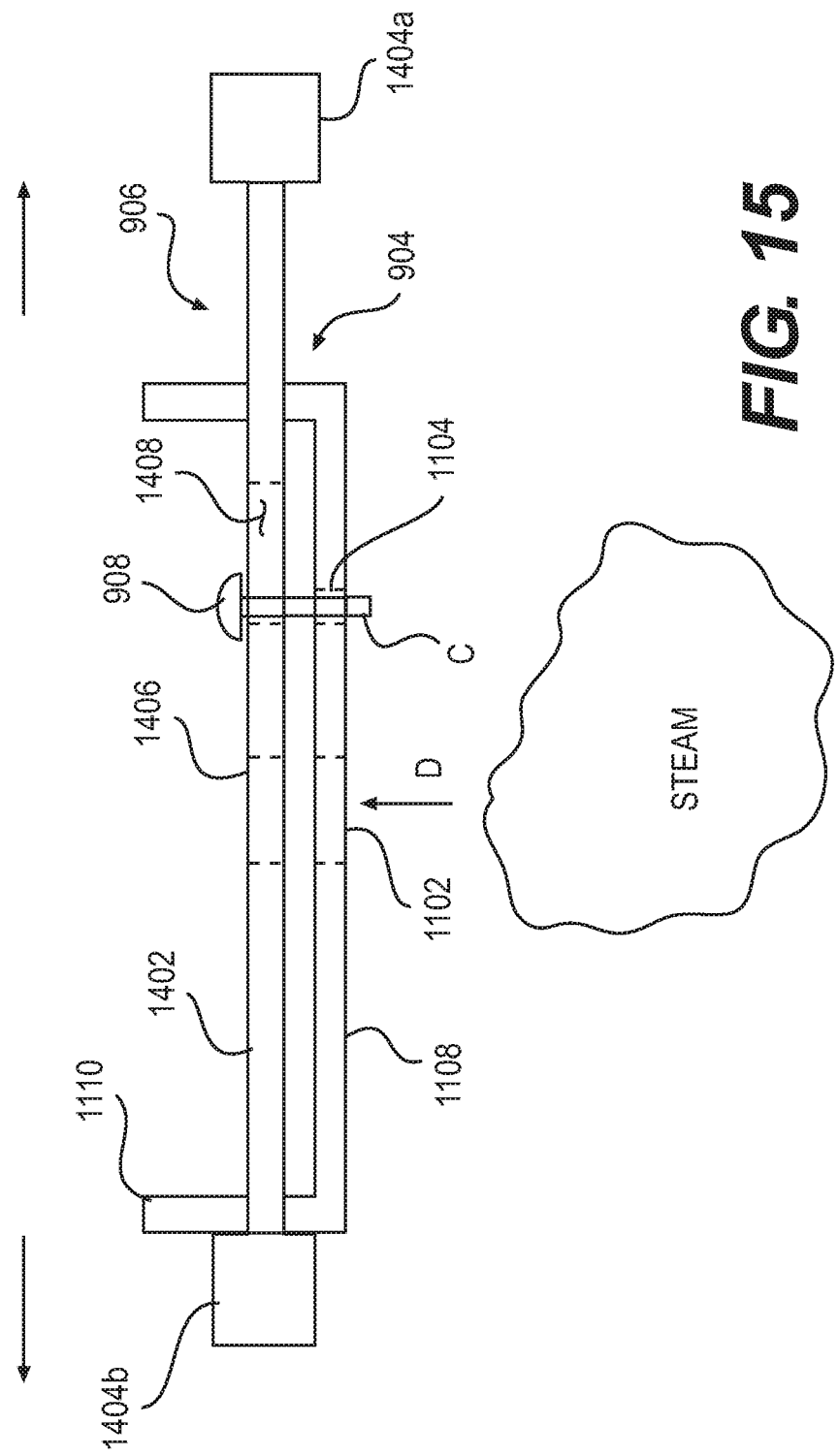
FIG. 15 illustrates a cross sectional side view of an assembly of the baffle assembly 906, baffle retention pin 908, and whistle insert 905 according to aspects of the embodiments.
Figure 16:
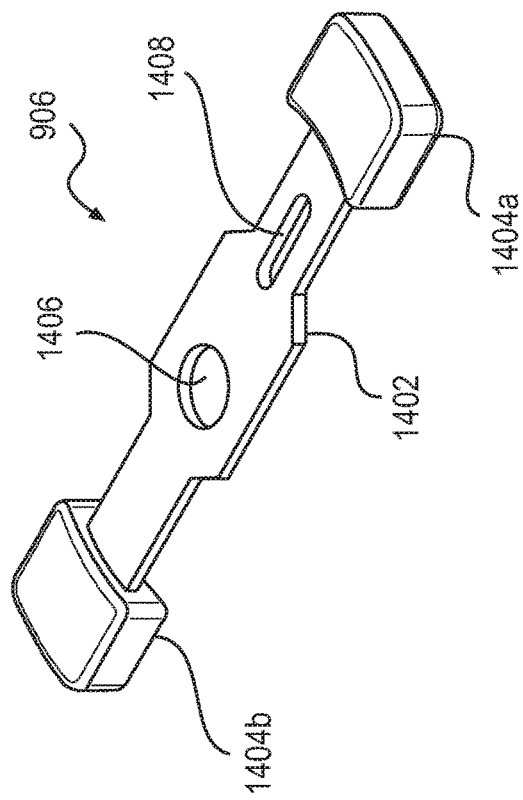
FIG. 16 illustrates a top perspective view of the baffle assembly 906 of FIG. 14A.

Attention is now directed to FIG. 14A, which illustrates a top view of baffle 906 used in the whistle lid assembly of FIG. 9A according to aspects of the embodiments, and FIG. 14B, which illustrates a side view of baffle 906. Baffle 906 comprises baffle body 1402, which is a substantially flat piece, with several dimensioned parts as shown in FIGS. 14A and 14B. That is, as shown in FIG. 14A, there is a wider middle portion wherein whistle hole (hole) 1406 has been fashioned, and towards a right side, as shown in FIG. 14A, there is insert sliding slot (slot) 1408. Hole 1406 is dimensioned to be substantially similar in size to that of insert hole 1102 when slid to an extreme right side (as shown in FIGS. 14A and 15; though, as those of skill in the art can appreciate, it is equally possible to locate slot 1408 on the other side of baffle 906, or to turn it over, and install in that manner). Located at either or both ends of baffle body 1402 are baffle holders 1404a,b, which provide an insulated means for holding and moving baffle 906 to allow the whistle to sound, or to cut it off. According to further aspects of the embodiments, baffle 906 can be made of different materials that do not conduct heat, such that insulating holders 1404a,b may not be necessary. According to various aspects of the embodiments, baffle holders 1404a,b can be made of a grade of plastic that is heat resistant so that a user can move baffle 906 to the left or right with little or no danger of burning themselves. FIG. 16 illustrates a top perspective view of baffle 906 of FIGS. 14A and 14B.

FIG. 15 illustrates a cross sectional side view of an assembly of baffle 906, pin 908, and insert 905 according to aspects of the embodiments. As those of skill in the art can appreciate, the illustration of FIG. 15 is exaggerated for the purpose of clarity; that is, in an article of manufacture of pot assembly 800 according to aspects of the embodiments, baffle 906 would rest upon insert 904, and there would be no gap between the two, as shown in FIG. 15. As shown in FIG. 15, pin 908 has been placed through slot 1408 and pin hole 1104, and secured to the underside of insert 904 at point C using any one of different means and method for attachment, such as press-fitting, or welding, among other methods. In the condition shown in FIG. 15, hole 1406 is in substantial alignment with hole 1102 such that the steam can rise and move in the direction of arrow D through the two holes and up to the hole in whistle cap 910 to cause the whistle sound, in the manner described herein. As shown, baffle 906 has been moved to the right, in the direction of arrow B, such that pin 908 is substantially resting against a left-most portion of slot 1408; as discussed above, the outer diameter of pin 908 is somewhat smaller than the diameter of slot 1408 so that the back and forth (left-right) sliding motion (arrows A and B) can be substantially easily affected by user. According to further aspects of the embodiments, pin 908 can be attached in such a manner, or the diameters produced with such dimensions, that the sliding motion includes a frictional engagement so that baffle 906 is retained substantially in place unless and until a certain magnitude of force is applied thereto to move baffle 904 to either the left or the right, e.g., to allow the whistle sound, or to substantially prevent it. In the latter case, baffle 906, in the configuration shown in FIG. 15, would be moved or slid to the left, in the direction of arrow A, until holes 1406 and 1102 are no longer in substantially alignment, and the flow of steam through the holes 1406 and 1102 would be substantially prevented, stopping the whistle sound from being generated, according to further aspects of the embodiments.

Figure 19:
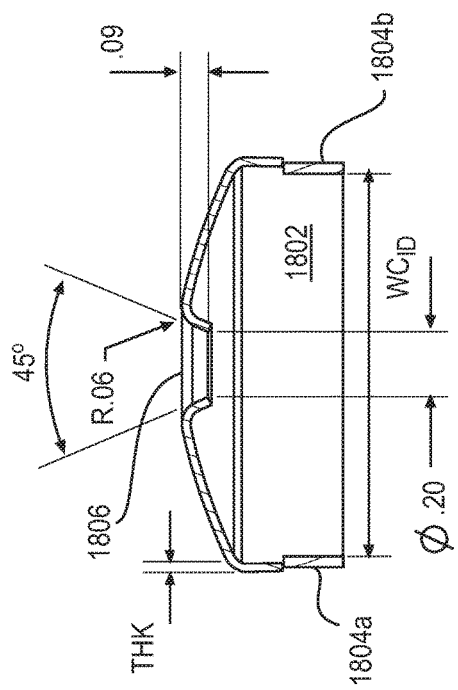
FIG. 19 illustrates a cross-section view of the whistle cap 910 in FIG. 18 along lines BB of FIG. 18.
Figure 18:
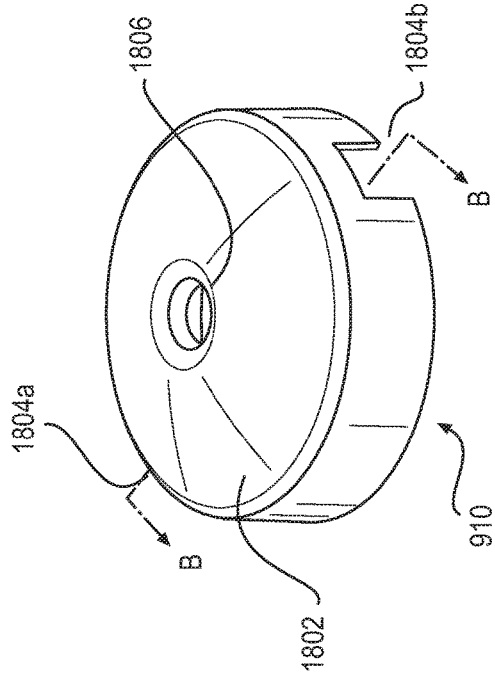
FIG. 18 illustrates a top perspective view of a whistle cap 910 used in the whistle lid assembly of FIG. 9A according to aspects of the embodiments.

Attention is now directed towards FIG. 18, which illustrates a top perspective view of whistle cap 910 that is used in the whistle lid assembly of FIG. 9A according to aspects of the embodiments, and FIG. 19, which illustrates a cross-sectional view of whistle cap 910 along lines BB of FIG. 18. The inner diameter of whistle cap 910, $WC_{ID}$, is larger than both of the outer diameters of insert 904 ($WI_{OD}$) and whistle body 902 ($WBC_{OD}$), so that as shown in FIGS. 9B and 9C, it can be placed over both insert 904 and body 902 to form a substantially gas-tight seal. According to further aspects of the embodiments, whistle cap 910 comprises whistle cap body 1802, and whistle cap baffle channels 1804a,b, constructed in a substantially similar manner as that of channels 1106a,b of insert 904 so that baffle 906 can slide as described above to allow the whistle sound, or to substantially prevent it. As shown in both of FIGS. 18 and 19, cap 901 further comprises whistle cap hole (cap hole) 1806, which operates in a substantially similar manner to that of upper hole 312, as shown and described above in regard to FIG. 3, among other FIGS.

Figure 21:
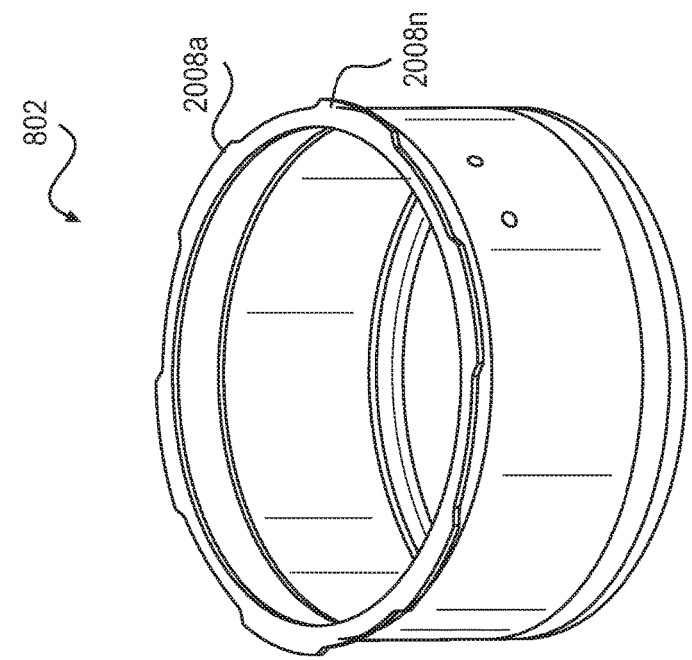
FIG. 21 illustrates an assembled view of the pot assembly 802 of FIG. 20.
Figure 20:
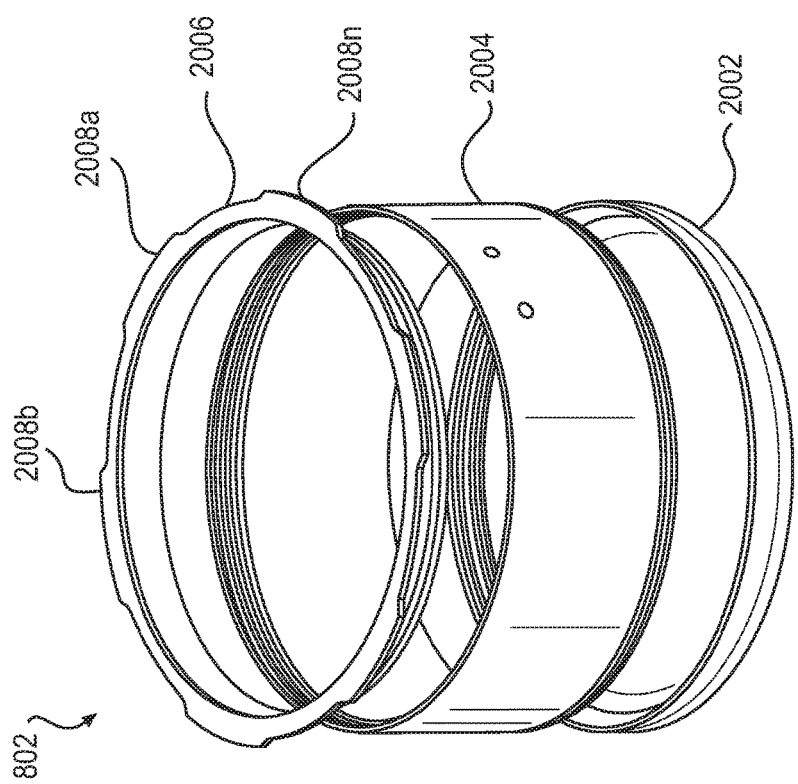
FIG. 20 illustrates a pre-assembly top perspective view of a pot-assembly 802 used in the pot and whistling lid assembly 800 of FIG. 8 according to aspects of the embodiments.

Referring now to FIGS. 20 and 21, therein are shown a pre-assembly top perspective view of pot-assembly 802 (FIG. 18) used in pot and whistling lid assembly 800 of FIG. 8 according to aspects of the embodiments, and an assembled view of pot assembly 802 (FIG. 21). According to an aspect of the embodiments, pot 802 can be fabricated from component pieces as shown in FIG. 18; that is, pot 802 can be fabricated from bottom portion 2002, middle portion 2004, and top portion 2006. As shown in FIG. 20, the three component pieces are fabricated with threads so that they can be threadedly assembled with each other. Those of skill in the art can appreciate that this is but one method of assembling pot 802, as there are numerous other methods and means known to those of skill in the art. Further, top portion 2006 comprises a plurality of pot-lid interlock protrusions 2008a-n that interface with corresponding lid-pot interlock protrusions 2202a-n as shown in FIG. 22, which illustrates a top perspective view of lid 806 used in pot and whistling lid assembly 800 of FIG. 8 according to aspects of the embodiments. Also shown in FIG. 22, as well as FIG. 23, which illustrates a bottom perspective view of lid 806, is lid hole 2204 through which whistle body 902 can be attached as a conduit for the steam to escape, and eventually cause the whistle sound through operation of whistle assemble 810, in the manner described above according to aspects of the embodiments.

In use, which is substantially easier if lid handle 808 is attached to lid 806, a user can typically place lid on top of top portion 2006 of pot 802, in such a manner that pot-lid interlock protrusions 2008a-n are interspersed between corresponding lid-pot interlock protrusions 2202a-n and then twist lid 806 in a clockwise manner, as viewed from above, to cause the protrusions 2008a-n to interlock with protrusions 2202a-n, thereby forming a fairly complete gaseous seal between pot 802 and lid 806, so that substantially all of the steam is forced to exist via whistle body 902, and the remainder of whistle assembly 810 according to aspects of the embodiments. As those of skill in the art can appreciate, the twisting of lid 806 with respect to pot 802 could be counter-clockwise instead of clockwise. In operation, pot-lid interlock mechanisms 2008 fit within, or are receive by, lid-pot interlock mechanisms 2202 when coupled together, and force lid 806 down upon an upper surface of pot 802 to form a substantially impermeable gaseous sealing barrier between lid 806 and pot 802.

Figure 24:
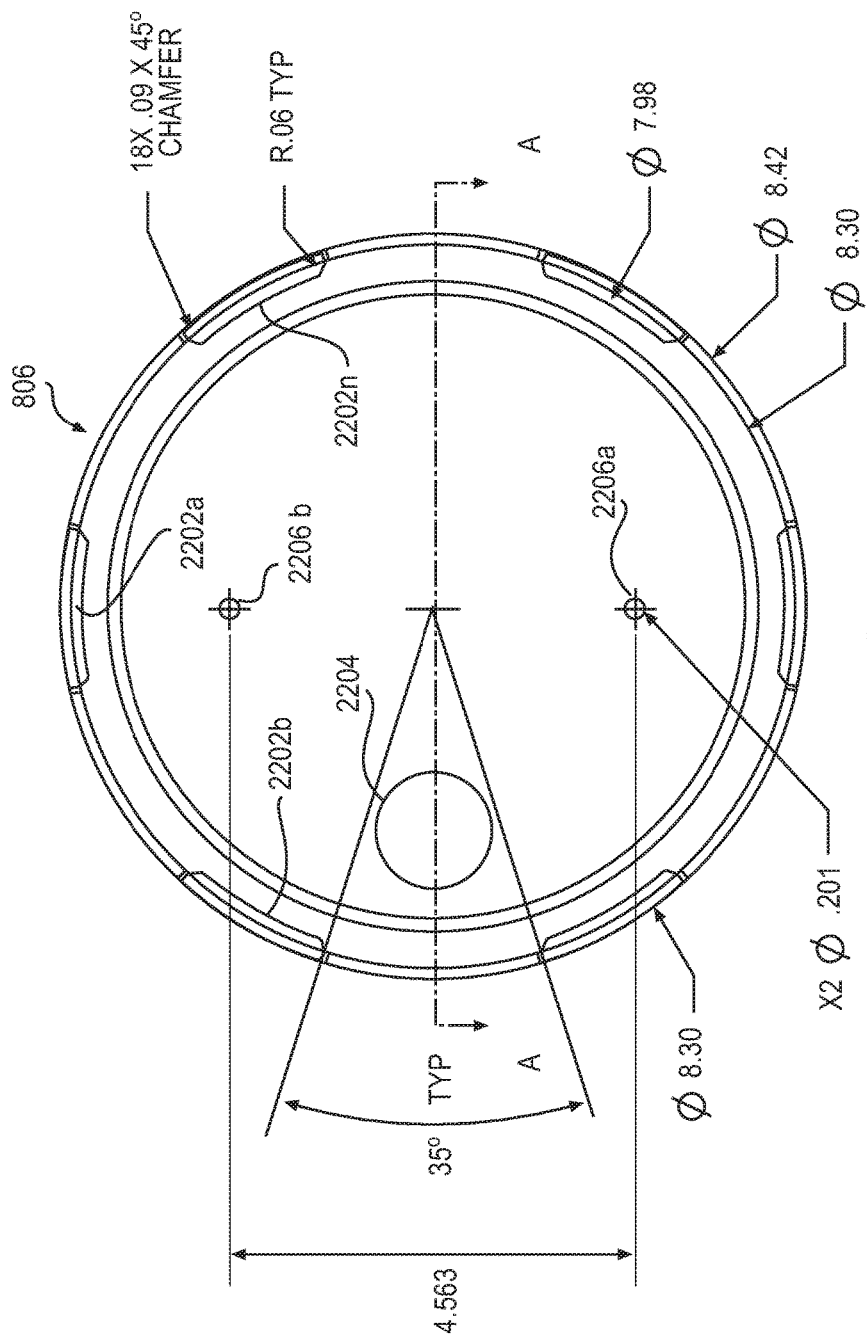
FIG. 24 illustrates a bottom view of the lid 806 of FIG. 22.
Figure 25:
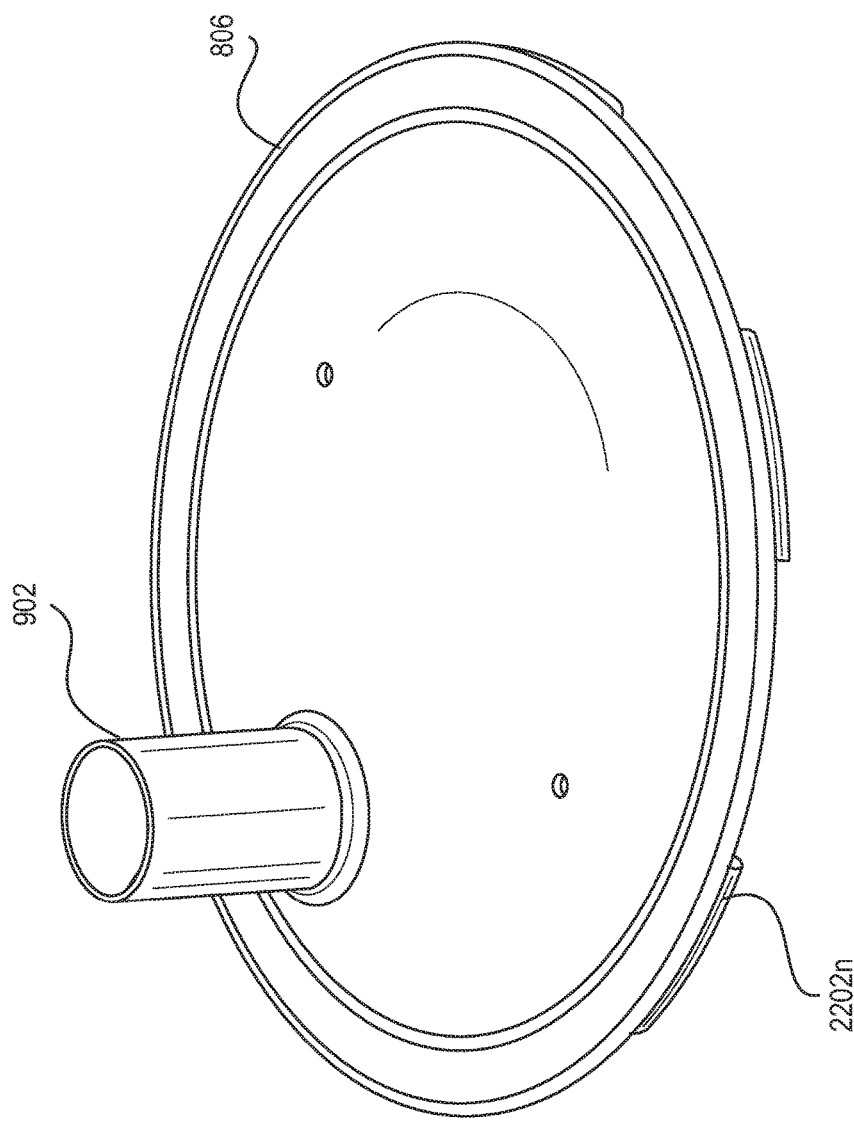
FIG. 25 illustrates a top perspective view of an assembly of the lid 806 and whistle body 902 according to aspects of the embodiments.
Figure 26:
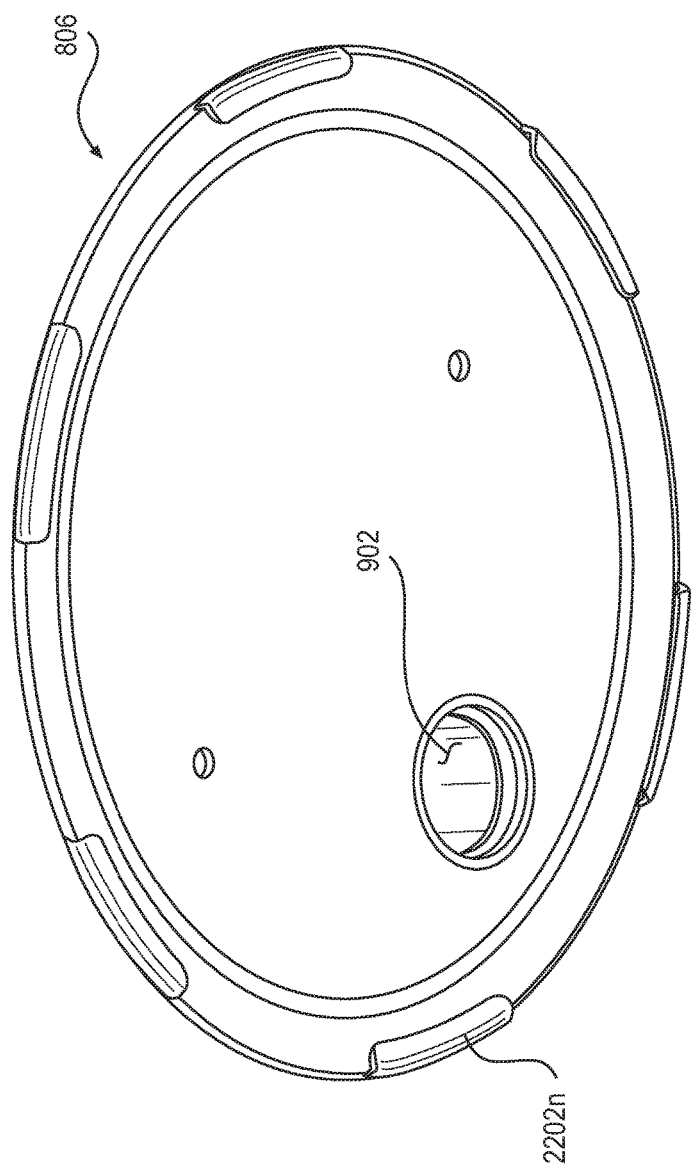
FIG. 26 illustrates a bottom perspective view of the assembly of FIG. 25.
Figure 27:
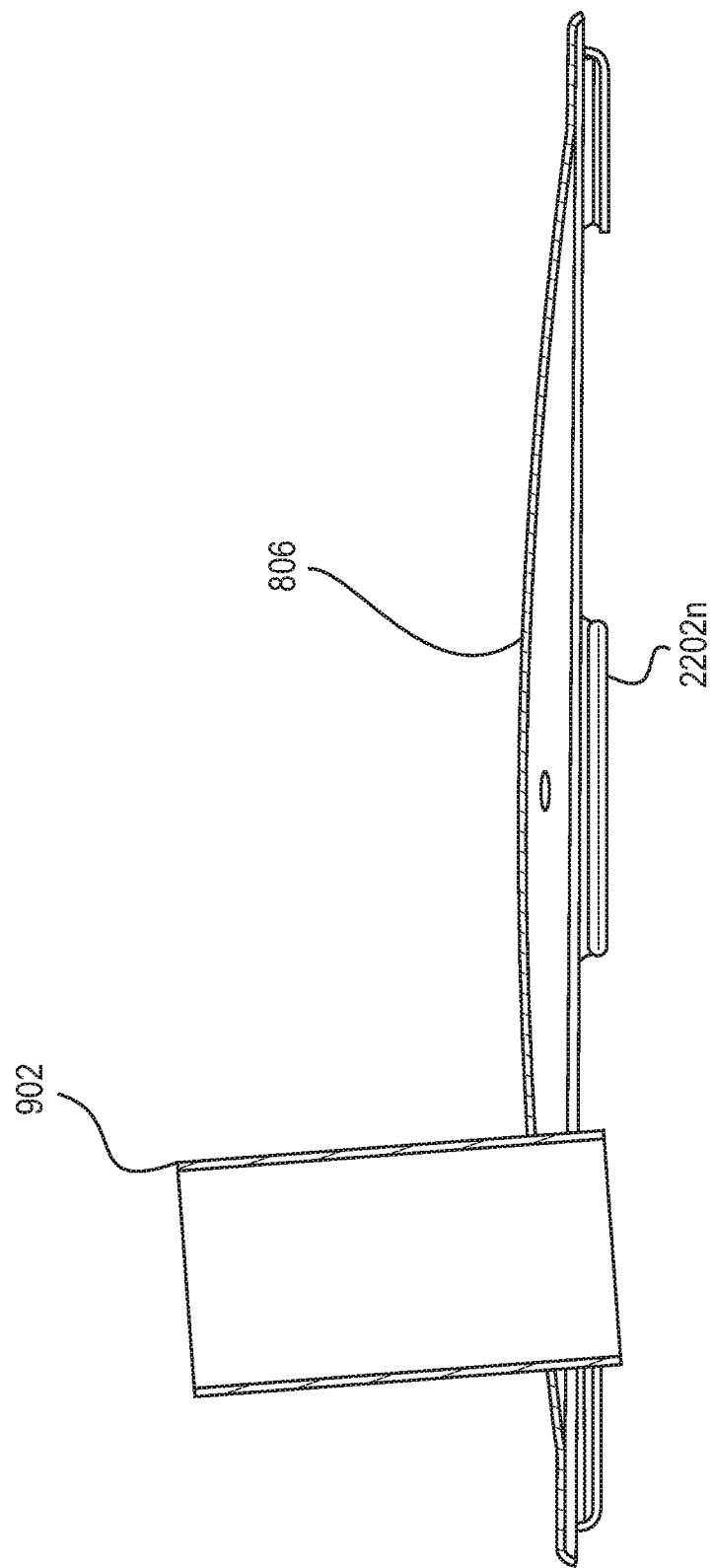
FIG. 27 illustrates a cross-sectional side view of the assembly of FIGS. 25 and 26.

FIG. 24 illustrates a bottom view of lid 806 of FIG. 22, and FIGS. 25-27 illustrate a top perspective view of an assembly of lid 806 and whistle body 902, a bottom perspective view of the assembly of lid 806 and whistle body 902, and a cross-sectional side view of the assembly of lid 806 and whistle body 902, respectively, according to aspects of the embodiments.

Figure 28:
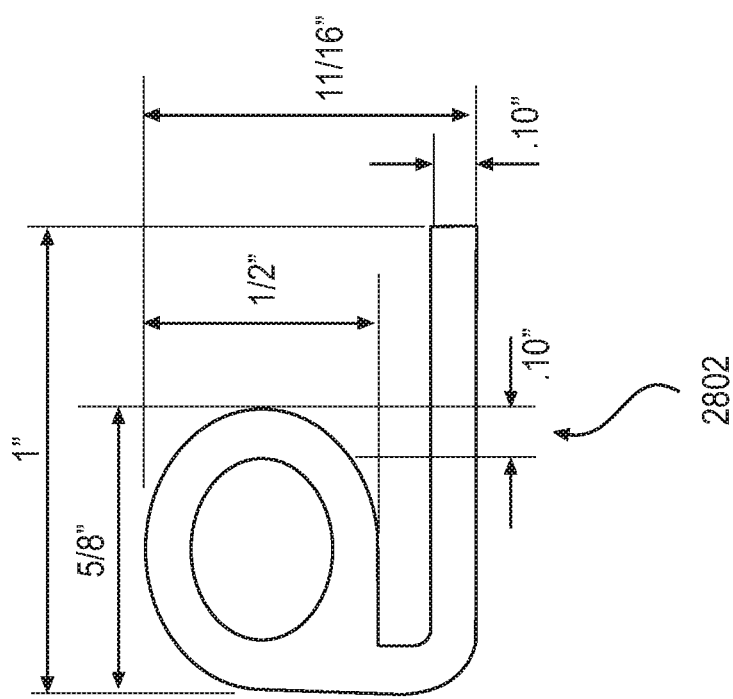
FIG. 28 illustrates a cross sectional view of a gasket for use with a further aspect of the embodiments of the lid assembly.
Figure 29:
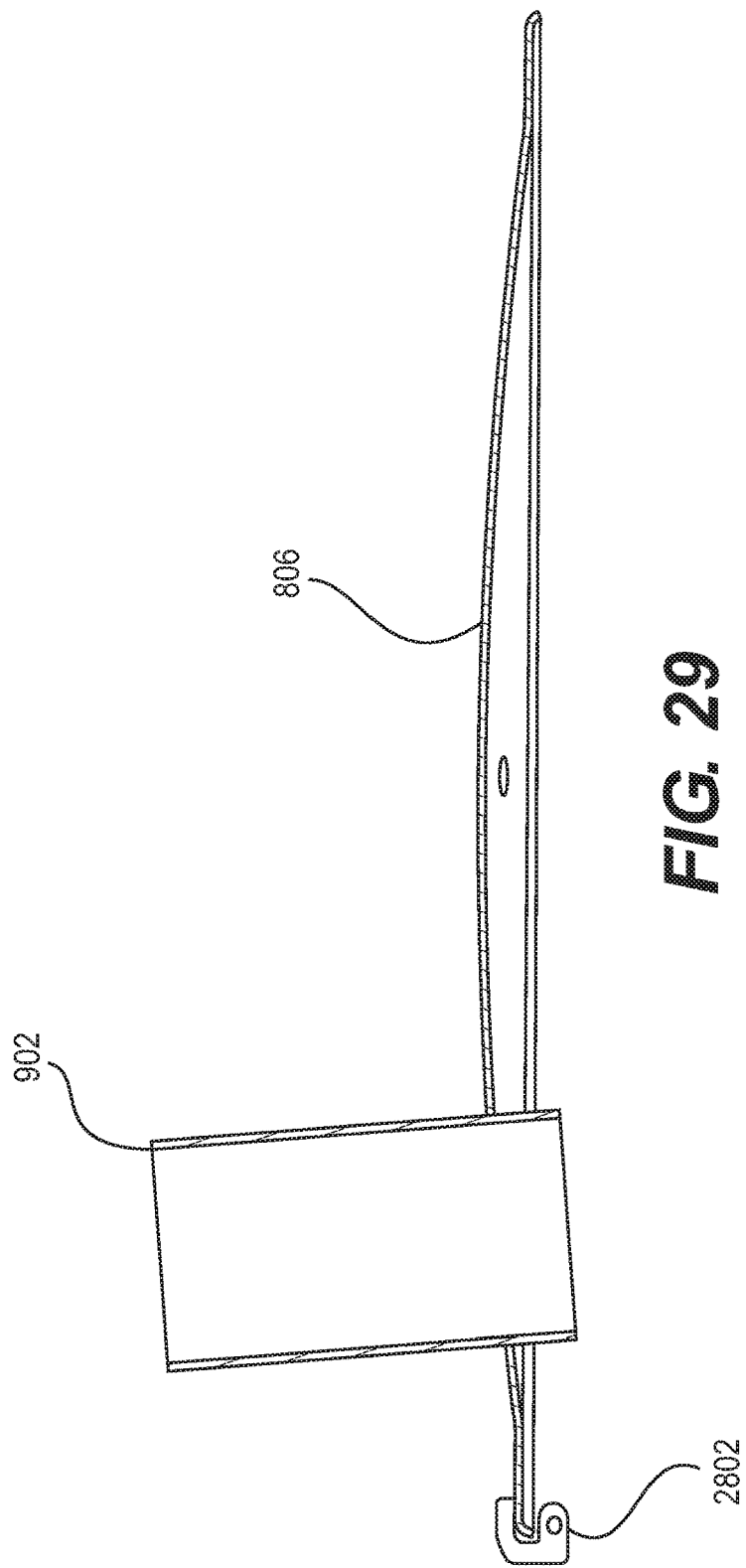
FIG. 29 illustrates a cross sectional view of the lid assembly for use with the pot and whistling assembly of FIG. 8 with the gasket of FIG. 28 according to further aspects of the embodiments.

FIG. 28 illustrates a cross sectional view of gasket 2802 for use with a further aspect of the embodiments of the lid assembly, and FIG. 29 illustrates a cross sectional view of lid 806 for use with pot and whistling assembly 800 as shown in FIG. 8, among other Figures, with gasket 2802 according to further aspects of the embodiments.

FIG. 29 illustrates a partial cross sectional view of lid 806 with gasket 2802; in assembly, gasket 2802 substantially completely covers the perimeter of lid 806 to form a substantially gaseous proof seal with pot 802; this allows the steam to pass through whistle assembly 810 in a manner as described above in regard to the other aspects of the embodiments described herein.

The disclosed embodiments provide a whistling lid for a pot that can be used to boil liquids, generally in the preparation of food for consumption. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

I claim:

1. An assembly, comprising:
   a whistling lid assembly including:
   a lid;
   a first hole formed in the lid; and
   a whistle assembly attached to the lid assembly about the first hole in the lid, the whistle assembly comprising—
      a whistle body adapted to be attached to the lid at the first hole in the lid to form a substantially impermeable gaseous sealing barrier,
      a whistle insert adapted to be attached to an uppermost part of the whistle body, the whistle insert comprising a second hole, and
      a whistle cap adapted to be attached over both of the whistle body and whistle insert in an interface region to form a substantially impermeable gaseous sealing barrier to prevent gases from escaping the interface region, the whistle cap further comprising a third hole, wherein
      when steam passes through the first hole in the lid to the whistle assembly, a whistling noise is generated through interaction between the steam, the second hole and the third hole.

2. The assembly according to claim 1, further comprising:
   a baffle assembly adapted to interface with both of the whistle insert and whistle cap to substantially allow the flow of steam, thereby allowing whistle noise generation, and to substantially prevent the flow of steam thereby substantially preventing whistle noise generation, upon being moved between a first position and a second position.

3. The assembly according to claim 2, wherein the baffle assembly comprises:
   a baffle body; and
   a baffle whistle hole; wherein
   the baffle assembly is adapted to slide in both a first direction and a second direction, opposite to the first direction, and wherein when the baffle assembly is slid in a first direction, the baffle whistle hole is in substantial alignment with the second hole to substantially allow steam to escape, causing the whistle sound, and further wherein
   when the baffle assembly is slid in a second direction, the baffle whistle hole is not in substantial alignment with the second hole, thereby substantially preventing steam from escaping, and substantially preventing the whistle sound from being produced.

4. The assembly according to claim 3, wherein
   the whistle insert comprises a first and second whistle insert baffle channel, and wherein
   the whistle cap comprises a first and second whistle cap baffle channel, and further wherein
   in assembly, the first and second whistle insert baffle channels are substantially aligned with respective ones of the first and second whistle cap baffle channels, and further wherein
   the baffle assembly is configured to extend through and slide within both of the first and second whistle insert baffle channels and the first and second whistle cap baffle channels.

5. The assembly according to claim 4, wherein the baffle assembly further comprises:
   a baffle sliding slot;
   a baffle retention pin adapted to retain the baffle to the whistle insert, wherein the baffle retention pin is further adapted to fit within the baffle sliding slot and be retained by an insert pin hole located on the whistle insert.

6. The assembly according to claim 1, further comprising:
   a pot adapted to retain solid and liquid contents, and further adapted to form a substantially impermeable gaseous sealing barrier with the lid.

7. The assembly according to claim 6, wherein the substantially impermeable gaseous sealing barrier between the lid and the pot comprises:
   a first plurality of first interlock mechanisms formed on an upper surface of the pot; and
   a second plurality of second interlock mechanisms formed on a lower surface of the lid, and wherein
   the first and second interlocking mechanisms are adapted to interface with each other to form the substantially impermeable gaseous sealing barrier between the lid and the pot when a user twists the lid relative to the pot in such a manner that the first interlock mechanisms fit within a receptacle of the second interlock mechanisms and cause the lid to be pulled down against the upper surface of the pot.

8. The assembly according to claim 6, wherein the substantially impermeable gaseous sealing barrier between the lid and the pot comprises:
   a gasket located substantially completely about a lower surface of the lid.

* * * * *